US010395804B2

(12) United States Patent
Bao et al.

(10) Patent No.: US 10,395,804 B2
(45) Date of Patent: Aug. 27, 2019

(54) ISOLATING SEMICONDUCTING SINGLE-WALLED NANOTUBES OR METALLIC SINGLE-WALLED NANOTUBES AND APPROACHES THEREFOR

(71) Applicant: The Board of Trustees of the Leland Stanford Junior University, Stanford, CA (US)

(72) Inventors: Zhenan Bao, Stanford, CA (US); Igor Pochorovski, Mountain View, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 127 days.

(21) Appl. No.: 15/080,313

(22) Filed: Mar. 24, 2016

(65) Prior Publication Data

US 2016/0280548 A1    Sep. 29, 2016

Related U.S. Application Data

(60) Provisional application No. 62/137,599, filed on Mar. 24, 2015.

(51) Int. Cl.
*C01B 32/17* (2017.01)
*C01B 32/168* (2017.01)
(Continued)

(52) U.S. Cl.
CPC .............. *H01C 7/00* (2013.01); *C01B 32/172* (2017.08); *C08F 136/20* (2013.01); *C01B 2202/02* (2013.01); *C01B 2202/22* (2013.01)

(58) Field of Classification Search
CPC .............. C01B 32/172; C01B 2202/02; C01B 2202/22; C01B 32/17; C01B 32/168;
(Continued)

(56) References Cited

U.S. PATENT DOCUMENTS 7,737,188 B2 *  6/2010  McGown .............. B82Y 30/00
                                                516/106
8,252,954 B2 *  8/2012  Raston .................... C07C 37/62
                                                562/20

(Continued)

OTHER PUBLICATIONS

Saito "Non-Destructive Extraction of Semiconducting Single Walled Carbon Nanotubes by Wrapping with Flexible Porphyrin Polypeptides and the Supramolecular Photodynamics." ECS Transactions, 2 (12) 157-165 (Year: 2007).*

(Continued)

*Primary Examiner* — Tri V Nguyen
(74) *Attorney, Agent, or Firm* — Crawford Maunu PLLC

(57) ABSTRACT

Embodiments in accordance with the present disclosure include methods, polymers, and complexes. For example, a method embodiments includes providing a solution including a disassembled supramolecular polymer and a bond disrupting agent, adding an antisolvent to the solution to precipitate the supramolecular polymer, and isolating the precipitated supramolecular polymer from the bond disrupting agent. The isolated supramolecular polymer is configured to selectively disperse single-walled carbon nanotubes (SWNTs) of a particular electrical type from a SWNT mixture including SWNTS of at least two electrical types.

23 Claims, 22 Drawing Sheets

(51) Int. Cl.
  *C01B 32/172* (2017.01)
  *C01B 32/174* (2017.01)
  *H01C 7/00* (2006.01)
  *C08F 136/20* (2006.01)
(58) Field of Classification Search
  CPC ....... C01B 32/174; B82Y 40/00; B82Y 30/00;
  C08F 136/20
  USPC .......................... 252/500, 510, 511; 977/742
  See application file for complete search history.

(56) References Cited

U.S. PATENT DOCUMENTS

| | | | |
|---|---|---|---|
| 2008/0025904 A1* | 1/2008 | Mendoza | B82Y 30/00 423/445 B |
| 2011/0034641 A1 | 2/2011 | Janssen et al. | |
| 2011/0204281 A1* | 8/2011 | Rouse | B82Y 30/00 252/75 |
| 2012/0104328 A1 | 5/2012 | Park et al. | |
| 2013/0082234 A1 | 4/2013 | Bao et al. | |
| 2013/0303769 A1 | 11/2013 | Rybtchinski et al. | |
| 2015/0353650 A1* | 12/2015 | Nicola | C08F 8/32 524/577 |
| 2017/0229657 A1 | 8/2017 | Bao et al. | |

OTHER PUBLICATIONS

Llanes-Pallas "Modular Engineering of H-Bonded Supramolecular Polymers for Reversible Functionalization of Carbon Nanotubes." J. Am. Chem. Soc. 2011, 133, 15412-15424. (Year: 2011).*
Fujigaya "Methodology for Homogeneous Dispersion of Single-walled Carbon Nanotubes by Physical Modification." Polymer Journal, vol. 40, No. 7, pp. 577-589. (Year: 2008).*
Ajayan, P. M. "Nanotubes from carbon." Chemical reviews 99.7 (1999): 1787. Abstract/Article not readily available.
Baughman, Ray H., Anvar A. Zakhidov, and Walt A. de Heer. "Carbon nanotubes—the route toward applications." science 297. 5582 (2002): 787-792.
Snow, Eric S., F. K. Perkins, and Joshua A. Robinson. "Chemical vapor detection using single-walled carbon nanotubes." Chemical Society Reviews 35.9 (2006): 790-798.
Kauffman, Douglas R., and Alexander Star. "Carbon nanotube gas and vapor sensors." Angewandte Chemie International Edition 47.35 (2008): 6550-6570. Abstract only.
Cao, Qing, and John A. Rogers. "Ultrathin films of single-walled carbon nanotubes for electronics and sensors: a review of fundamental and applied aspects." Advanced Materials 21.1 (2009): 29-53.
Rutherglen, Chris, Dheeraj Jain, and Peter Burke. "Nanotube electronics for radiofrequency applications." Nature Nanotechnology 4.12 (2009): 811-819. Abstract only.
Opatkiewicz, Justin, Melburne C. LeMieux, and Zhenan Bao. "Nanotubes on display: how carbon nanotubes can be integrated into electronic displays." Acs Nano 4.6 (2010): 2975-2978. Abstract only.
Cataldo, Sebastiano, et al. "Carbon nanotubes and organic solar cells." Energy & Environmental Science 5.3 (2012): 5919-5940. Abstract only.
Ratier, Bernard, et al. "Organic solar cell materials and active layer designs—improvements with carbon nanotubes: a review." Polymer International 61.3 (2012): 342-354.
Cao, Qing, and Shu-jen Han. "Single-walled carbon nanotubes for high-performance electronics." Nanoscale 5.19 (2013): 8852-8863.
De Volder, M. F. L.; Tawfick, S. H.; Baughman, R. H.; Hart, A. J., "Carbon Nanotubes: Present and Guture Commercial Applications" Science 2013, vol. 339, pp. 535-539.
Tulevski, George S., et al. "Toward high-performance digital logic technology with carbon nanotubes." ACS nano 8.9 (2014): 8730-8745. Abstract only.

Hersam, Mark C. "Progress towards monodisperse single-walled carbon nanotubes." Nature Nanotechnology 3.7 (2008): 387-394. Abstract only.
Zhang, Yani, and Lianxi Zheng. "Towards chirality-pure carbon nanotubes." Nanoscale 2.10 (2010): 1919-1929. Abstract only.
Zhang, Hongliang, et al. "Separation and/or selective enrichment of single-walled carbon nanotubes based on their electronic properties." Chemical Society Reviews 40.3 (2011): 1324-1336. Abstract only.
Sun, Tinghui, et al. "Purification and separation of single-walled carbon nanotubes (SWCNTs)." Journal of nanoscience and nanotechnology 12.4 (2012): 2955-2963. Abstract only.
Tuncel, Dönüs. "Non-covalent interactions between carbon nanotubes and conjugated polymers." Nanoscale 3.9 (2011): 3545-3554.
Samanta, Suman Kalyan, et al. "Conjugated polymer-assisted dispersion of single-wall carbon nanotubes: the power of polymer wrapping." Accounts of chemical research 47.8 (2014): 2446-2456.
Cheng, Fuyong, et al. "Soluble, discrete supramolecular complexes of single-walled carbon nanotubes with fluorene-based conjugated polymers." Macromolecules 41.7 (2008): 2304-2308. Abstract only.
Yi, Wenhui, et al. "Wrapping of single-walled carbon nanotubes by a π-conjugated polymer: The role of polymer conformation-controlled size selectivity." The Journal of Physical Chemistry B 112.39 (2008): 12263-12269. Abstract only.
Imin, Patigul, Mokhtar Imit, and Alex Adronov. "Supramolecular Functionalization of Single-Walled Carbon Nanotubes (SWNTs) with Dithieno [3, 2-b: 2', 3'-d] pyrrole (DTP) Containing Conjugated Polymers." Macromolecules 44.23 (2011): 9138-9145. Abstract only.
Umeyama, Tomokazu, et al. "Dispersion of carbon nanotubes by photo-and thermal-responsive polymers containing azobenzene unit in the backbone." Chemical Communications 46.32 (2010): 5969-5971. Abstract only.
Zhang, Zengxing, et al. "Reversible dispersion and release of carbon nanotubes using foldable oligomers." Journal of the American Chemical Society 132.40 (2010): 14113-14117.
Wang, Wei Zhi, et al. "Degradable Conjugated Polymers: Synthesis and Applications in Enrichment of Semiconducting Single-Walled Carbon Nanotubes." Advanced Functional Materials 21.9 (2011): 1643-1651.
Lemasson, Fabien, et al. "Debundling, selection and release of SWNTs using fluorene-based photocleavable polymers." Chemical Communications 47.26 (2011): 7428-7430. Abstract only.
Imin, Patigul, Mokhtar Imit, and Alex Adronov. "Supramolecular functionalization of single-walled carbon nanotubes (SWNTs) with a photoisomerizable conjugated polymer." Macromolecules 45.12 (2012): 5045-5050. Abstract only.
Liang, Shuai, et al. "Reversible dispersion and releasing of single-walled carbon nanotubes by a stimuli-responsive TTFV-phenylacetylene polymer." Chemical Communications 48.25 (2012): 3100-3102. Abstract only.
Liang, Shuai, Guang Chen, and Yuming Zhao. "Conformationally switchable TTFV—phenylacetylene polymers: synthesis, properties, and supramolecular interactions with single-walled carbon nanotubes." Journal of Materials Chemistry C 1.35 (2013): 5477-5490. Abstract only.
Liang, Shuai, Yuming Zhao, and Alex Adronov. "Selective and reversible noncovalent functionalization of single-walled carbon nanotubes by a pH-responsive vinylogous tetrathiafulvalene-fluorene copolymer." Journal of the American Chemical Society 136.3 (2014): 970-977. Abstract only.
De Greef, Tom FA, et al. "Supramolecular polymerization." Chemical Reviews 109.11 (2009): 5687-5754. Copy/ Abstract not available.
Yan, Xuzhou, et al. "Stimuli-responsive supramolecular polymeric materials." Chemical Society Reviews 41.18 (2012): 6042-6065. Abstract only.
Llanes-Pallas, Anna, et al. "Modular engineering of H-bonded supramolecular polymers for reversible functionalization of carbon nanotubes." Journal of the American Chemical Society 133.39 (2011): 15412-15424. Abstract only.

(56) References Cited

OTHER PUBLICATIONS

Maggini, Laura, et al. "Azobenzene-based supramolecular polymers for processing MWCNTs." Nanoscale 5.2 (2013): 634-645. Abstract only.

Toshimitsu, Fumiyuki, and Naotoshi Nakashima. "Semiconducting single-walled carbon nanotubes sorting with a removable solubilizer based on dynamic supramolecular coordination chemistry." Nature communications 5 (2014).

Wang, H., Hsieh, B., Jiménez-Osés, G., Liu, P., Tassone, C.J., Diao, Y., Lei, T., Houk, K.N. and Bao, Z., 2015. Solvent effects on polymer sorting of carbon nanotubes with applications in printed electronics. Small, 11(1), pp. 126-133. 2014.

Hwang, Jeong-Yuan, et al. "Polymer structure and solvent effects on the selective dispersion of single-walled carbon nanotubes." Journal of the American Chemical Society 130.11 (2008): 3543-3553.

Sijbesma, Rint P., et al. "Reversible polymers formed from self-complementary monomers using quadruple hydrogen bonding." Science 278.5343 (1997): 1601-1604.

Beijer, Felix H., et al. "Strong dimerization of ureidopyrimidones via quadruple hydrogen bonding." Journal of the American chemical society 120.27 (1998): 6761-6769. Abstract only.

Söntjens, Serge HM, et al. "Stability and lifetime of quadruply hydrogen bonded 2-ureido-4 [1 H]-pyrimidinone dimers." Journal of the American Chemical Society 122.31 (2000): 7487-7493. Abstract only.

Berton, Nicolas, et al. "Influence of molecular weight on selective oligomer-assisted dispersion of single-walled carbon nanotubes and subsequent polymer exchange." Chemical Communications 48.19 (2012): 2516-2518. Abstract only.

Imin, Patigul, Fuyong Cheng, and Alex Adronov. "The effect of molecular weight on the supramolecular interaction between a conjugated polymer and single-walled carbon nanotubes." Polymer Chemistry 2.6 (2011): 1404-1408. Abstract only.

Dudek, Stephen P., et al. "Synthesis and energy-transfer properties of hydrogen-bonded oligofluorenes." Journal of the American Chemical Society 127.33 (2005): 11763-11768. Abstract only.

Abbel, Robert, et al. "White-light emitting hydrogen-bonded supramolecular copolymers based on π-conjugated oligomers." Journal of the American Chemical Society 131.2 (2008): 833-843.

Nish, Adrian, et al. "Highly selective dispersion of single-walled carbon nanotubes using aromatic polymers." Nature nanotechnology 2.10 (2007): 640-646.

Gomulya, Widianta, et al. "Semiconducting Single-Walled Carbon Nanotubes on Demand by Polymer Wrapping." Advanced Materials 25.21 (2013): 2948-2956.

Ding, Jianfu, et al. "Enrichment of large-diameter semiconducting SWCNTs by polyfluorene extraction for high network density thin film transistors." Nanoscale 6.4 (2014): 2328-2339.

Lee, Hang Woo, et al. "Selective dispersion of high purity semiconducting single-walled carbon nanotubes with regioregular poly (3-alkylthiophene) s." Nature communications 2 (2011): 541.

Liu, Yiliu, Zhiqiang Wang, and Xi Zhang. "Characterization of supramolecular polymers." Chemical Society Reviews 41.18 (2012): 5922-5932. Abstract only.

IsoSol-S100 Product description taken from http://www.nanointegris.com/IsoSol-S100, Jul. 2016.

Cohen, Yoram, Liat Avram, and Limor Frish. "Diffusion NMR spectroscopy in supramolecular and combinatorial chemistry: an old parameter—new insights." Angewandte Chemie International Edition 44.4 (2005): 520-554.

Wang, H. and Bao, Z. "Conjugated polymer sorting of semiconducting carbon nanotubes and their electronic applications." Nano Today (Jan. 7, 2016) 10, 737-758.

Bergin, Shane D., et al. "Towards Solutions of Single-Walled Carbon Nanotubes in Common Solvents." Advanced Materials 20.10 (2008): 1876-1881.

Wang, Xiao-Zhong, et al. "Selective Rearrangements of Quadruply Hydrogen-Bonded Dimer Driven by Donor—Acceptor Interaction." Chemistry—A European Journal 9.12 (2003): 2904-2913.

Li, Xiao-Qiang, et al. "Self-assembly of a new series of quadruply hydrogen bonded heterotrimers driven by the donor—acceptor interaction." Tetrahedron 61.40 (2005): 9600-9610.

Maji, Modhu Sudan, Thorben Pfeifer, and Armido Studer. "Transition-Metal-Free Synthesis of Conjugated Polymers from Bis-Grignard Reagents by Using TEMPO as Oxidant." Chemistry—A European Journal 16.20 (2010): 5872-5875. Abstract only.

Lee, Sang Ho, Toshikazu Nakamura, and Tetsuo Tsutsui. "Synthesis and characterization of oligo (9, 9-dihexyl-2, 7-fluorene ethynylene) s: For application as blue light-emitting diode." Organic letters 3.13 (2001): 2005-2007. Abstract only.

Wierenga, Wendell, et al. "5-Substituted 2-amino-6-phenyl-4 (3H)-pyrimidinones. Antiviral-and interferon-inducing agents." Journal of medicinal chemistry 23.3 (1980): 237-239. Abstract not available.

Knoben, Wout, Nicolaas AM Besseling, and Martien A. Cohen Stuart. "Chain stoppers in reversible supramolecular polymer solutions studied by static and dynamic light scattering and osmometry." Macromolecules 39.7 (2006): 2643-2653. Abstract only.

Lortie, Frédéric, et al. "Chain stopper-assisted characterization of supramolecular polymers." Macromolecules 38.12 (2005): 5283-5287. Abstract only.

Mistry, Kevin S., Brian A. Larsen, and Jeffrey L. Blackburn. "High-yield dispersions of large-diameter semiconducting single-walled carbon nanotubes with tunable narrow chirality distributions." ACS nano 7.3 (2013): 2231-2239. Abstract only.

Itkis, Mikhail E., et al. "Comparison of analytical techniques for purity evaluation of single-walled carbon nanotubes." Journal of the American Chemical Society 127.10 (2005): 3439-3448. Abstract only.

Premkumar, Thathan, Raffaele Mezzenga, and Kurt E. Geckeler. "Carbon nanotubes in the liquid phase: addressing the issue of dispersion." Small 8.9 (2012): 1299-1313.

\* cited by examiner

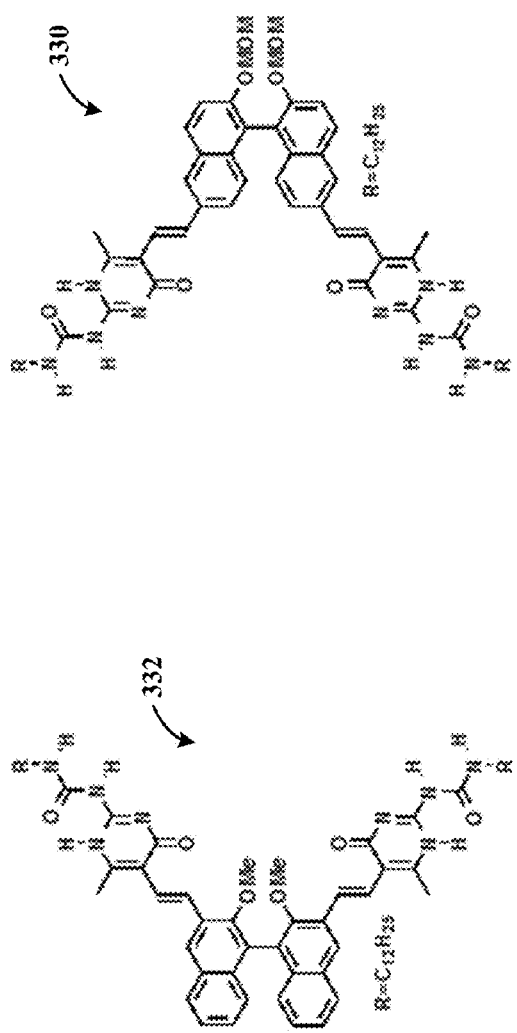
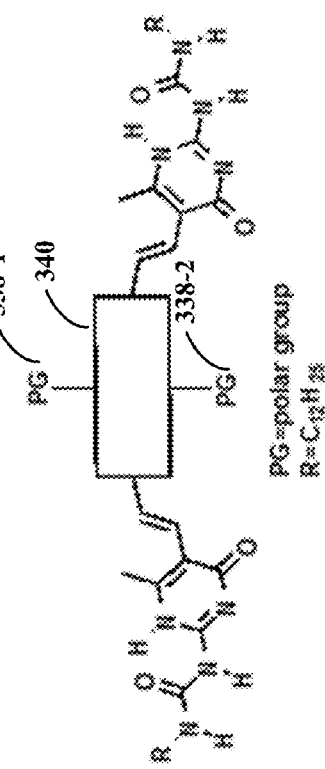
FIG. 3B
FIG. 3C

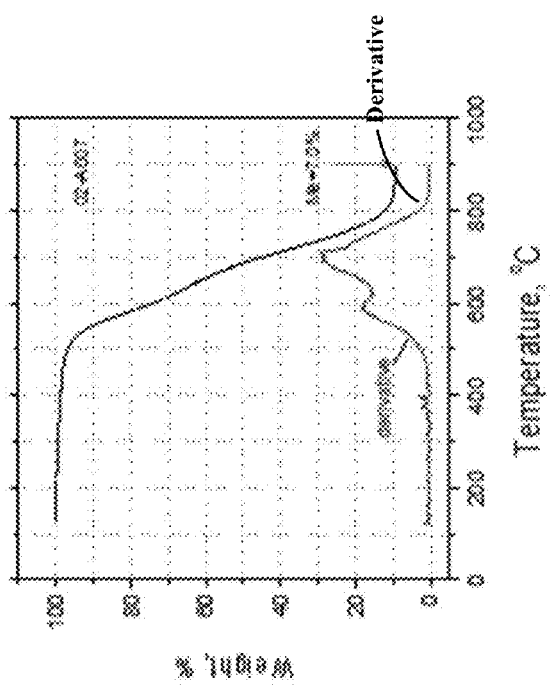
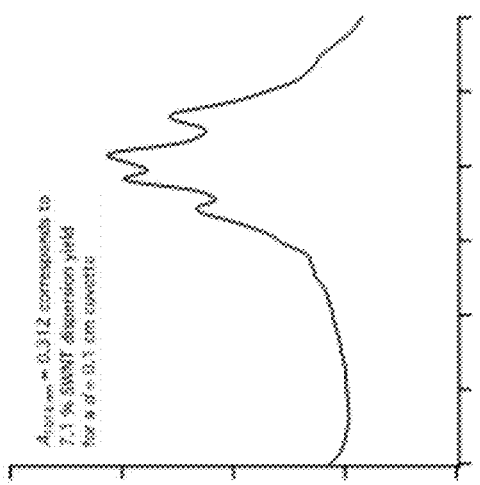
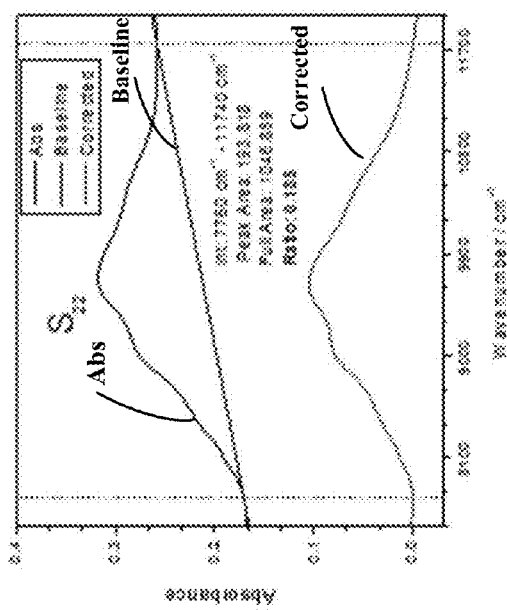
FIG. 10A
FIG. 10B
FIG. 10C

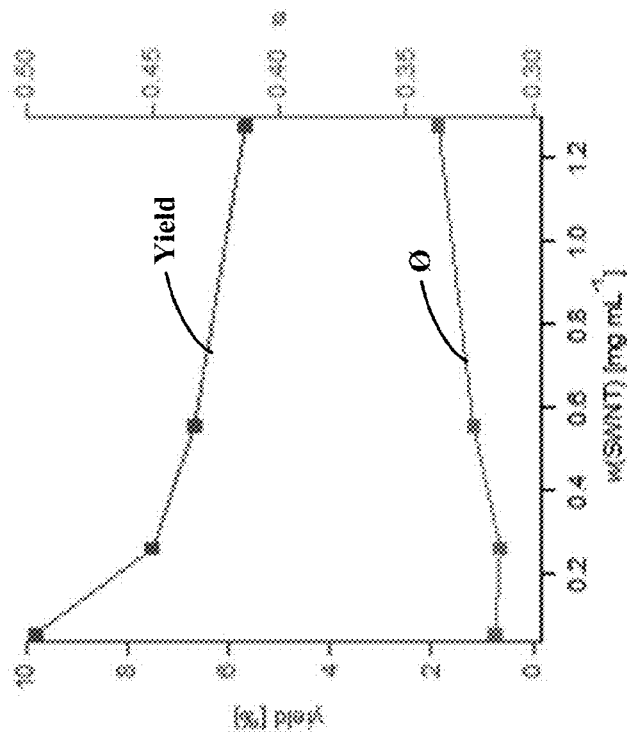
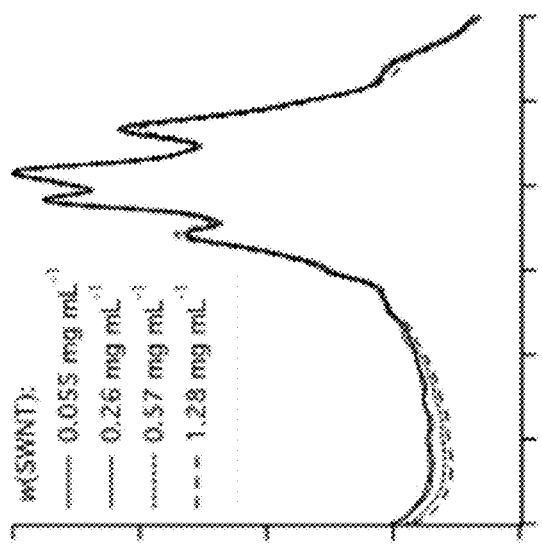
FIG. 12B
FIG. 12A

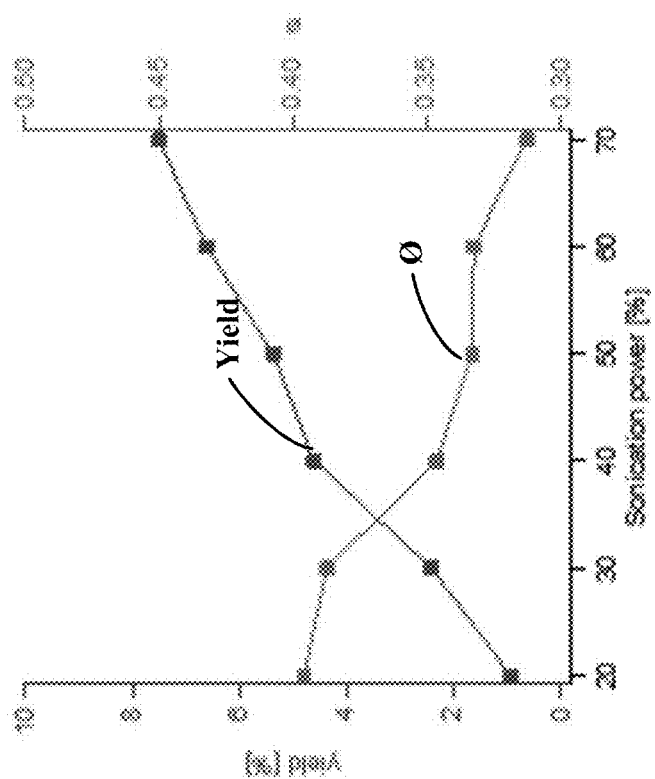
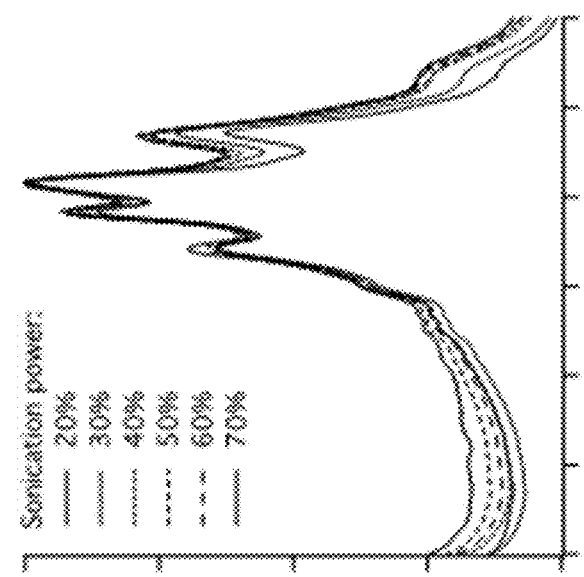
FIG. 13B
FIG. 13A

ISOLATING SEMICONDUCTING SINGLE-WALLED NANOTUBES OR METALLIC SINGLE-WALLED NANOTUBES AND APPROACHES THEREFOR

BACKGROUND

Carbon nanotubes (CNTs) are unique molecular structures that exhibit interesting and useful properties and may be utilized for a variety of devices. Example CNTs include single-walled nanotubes (SWNTs) and multi-walled nanotubes (MWNTs). SWNTs have a cylindrical sheet-like, one-atom-thick shell of hexagonally-arranged atoms.

CNTs have been used in a variety of applications that are increasing in number and diversity as their manufacture and implementation becomes more widespread. For instance, SWNTs have been increasingly considered for and/or used with advanced electronics applications. Carbon-based SWNTs are hollow structures composed, at least partially, of carbon atoms. SWNTS can be doped with other elements such as metals, boron and nitrogen. SWNTs are increasingly being used as conductors (e.g., nanowires) and to form electronic components such as field effect transistors (FETs), switches and others.

SWNTs have a tendency to grow in a manner that exhibits metallic and semiconducting mixtures due to various chiralities (e.g., geometric characteristics). For example, SWNTs grow as a mixture of bundled semiconducting SWNTs (S-SWNTs) with metallic SWNTs (M-SWNT). The M-SWNTs show ballistic behaviors and can be ideal for conducting connectors and electrodes for electronic devices. The S-SWNTs show high mobility and can be useful for high-current and high-speed nanotube FETs. By contrast, MWNTs tend to grow as metallic MWNTs.

The above issues as well as others have presented challenges to the isolation of semiconducting and/or metallic nanotubes for a variety of applications.

SUMMARY

The present invention is directed to overcoming the above-mentioned challenges and others related to the types of devices discussed above and in other implementations. The present invention is exemplified in a number of implementations and applications, some of which are summarized below as examples.

Various aspects of the present disclosure include use and/or formation of a supramolecular polymer. The supramolecular polymer includes a plurality of monomer units that are non-covalently linked to form the supramolecular polymer. The monomer units are characterized by ureido pyrimidinone moiety (UPy) terminals, carbon side-chains, and a moiety in the back-bone. In various specific embodiments, the moiety in the backbone includes a fluorene moiety, a thiophene moiety, a benzene moiety, a benzodithiophene moiety, a carbazole moiety, thienothiophene moiety, perylene diimide moiety, a isoindigo moiety, a diketopyrrolopyrrole moiety, a enantiopure binaphthol moiety and an oligomer or combination of two or more of the above moieties. In further specific embodiments, the supramolecular polymer is characterized by:

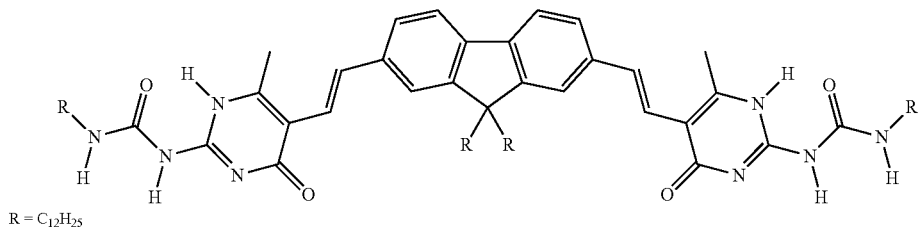

R = C₁₂H₂₅

The supramolecular polymer, in various embodiments, is configured to selectively disperse SWNTs of a particular electrical type from a SWNT mixture. A SWNT mixture, as used herein, includes SWNTs of a first electrical type and SWNTs of a second electrical type that are bundled together. For example, the supramolecular polymer is added to a SWNT mixture to form a mixture of non-dispersed SWNTS of the first electrical type and non-dispersed supramolecular polymer, and a dispersed complex that includes the SWNTs of the second electrical type and the supramolecular polymer. The non-dispersed SWNTs of the first electrical type (and the non-dispersed supramolecular polymer) are removed from the dispersed complex, such as by centrifuging and/or filtering the mixture. To isolate the SWNTs of the second electrical type, a bond disrupting agent is added to the dispersed complex. The bond disrupting agent disassembles the supramolecular polymer and releases the SWNTs of the second electrical type from the supramolecular polymer. The SWNTs of the second electrical type are then isolated from the disassembled supramolecular polymer and the bond disrupting agent, such as by centrifuging and/or filtering.

In various embodiments, dispersion parameters are set and/or adjusted to select a purity and yield of the resulting SWNTs of the second electrical type. For example, the ratio of supramolecular polymer to SWNT mixture, concentration of the SWNTs, sonication power and sonication time are adjusted, in various specific embodiments. In some specific embodiments, the isolated SWNTs of the particular electrical type have a diameter of between 0.6 and 2.2 nanometers (nm) and/or a purity of between 80-99.99 percent.

In accordance with various aspects the supramolecular polymer is re-assembled and isolated. For example, a solution is provided that includes the disassembled supramolecular polymer and the bond disrupting agent. The solution provided includes the SWNTS of the particular type removed and/or not yet removed, in various embodiments. An antisolvent is added to the solution to precipitate the supramolecular polymer. For example, the antisolvent, such as methanol, reassembles the supramolecular polymer from the disassembled oligomer or monomer units. The precipitated supramolecular polymer is isolated from the bond disrupting agent, such as by centrifuging the mixture of the disassembled supramolecular polymer and the bond disrupting agent to precipitate the supramolecular polymer and filtering the precipitated supramolecular polymer from a solution including the bond disrupting agent. The resulting isolated supramolecular polymer is reused to selectively disperse SWNTs of a particular electrical type from a SWNT mixture.

A number of aspects include methods of forming the supramolecular polymer. For example, vinylureido pyrimidinone (vinyl UPy) is formed by reacting iodocytosine with dodecyle isocyanate. The supramolecular polymer is then formed by reacting the vinyl UPy with a moiety compound. The moiety compound includes a fluorene moiety, a thiophene moiety, a benzene moiety, a carbazole moiety, an isoindigo moiety, a benzodithiophene moiety, thienothiophene moiety, perylene diimide moiety, a diketopyrrolopyrrole moiety, a enantiopure binaphthol moiety and an oligomer or combination of two or more of the above moieties in the back-bone, some of which may not be fully conjugated.

Other specific and related aspects include a complex and methods of forming the complex. The complex includes a supramolecular polymer as described above and dispersed SWNTs of a first electrical type, wherein the first electrical type includes S-SWNTs or M-SWNTs. In various specific embodiments, the complex is a part of a mixture that further includes nondispersed SWNTS of a second electrical type, wherein the second electrical type includes the other of the S-SWNTs or M-SWNTs.

In various further specific aspects of the present disclosure, the isolated SWNTs of the particular type are used to form electronic circuitry. The electronic circuitry includes transistors, stretchable electronics, flex circuits, flex transistors, thermal electronics, transparent electronics, display screens, solar panels, heaters and speakers, among other circuitry.

The above overview is not intended to describe each illustrated embodiment or every implementation of the present invention. The figures and detailed description (and referring to Appendices A-C that were filed in the underlying provisional application and fully incorporated herein) that follow more particularly exemplify these embodiments.

DESCRIPTION OF THE FIGURES

Various example embodiments may be more completely understood in consideration of the following detailed description in connection with the accompanying drawings, in which:

FIGS. 3A-3C show examples of monomer units of a supramolecular polymer, in accordance with various embodiments;

FIGS. 10A-10C illustrate examples of a SWNT mixture and resulting dispersed SWNTS isolated using a supramolecular polymer, in accordance with various embodiments;

FIGS. 12A-12B illustrate examples of adjusting the dispersion parameter of the SWNT concentration, in accordance with various embodiments;

FIGS. 13A-13B illustrate examples of adjusting the dispersion parameter of the sonication power, in accordance with various embodiments;

Figure 1:
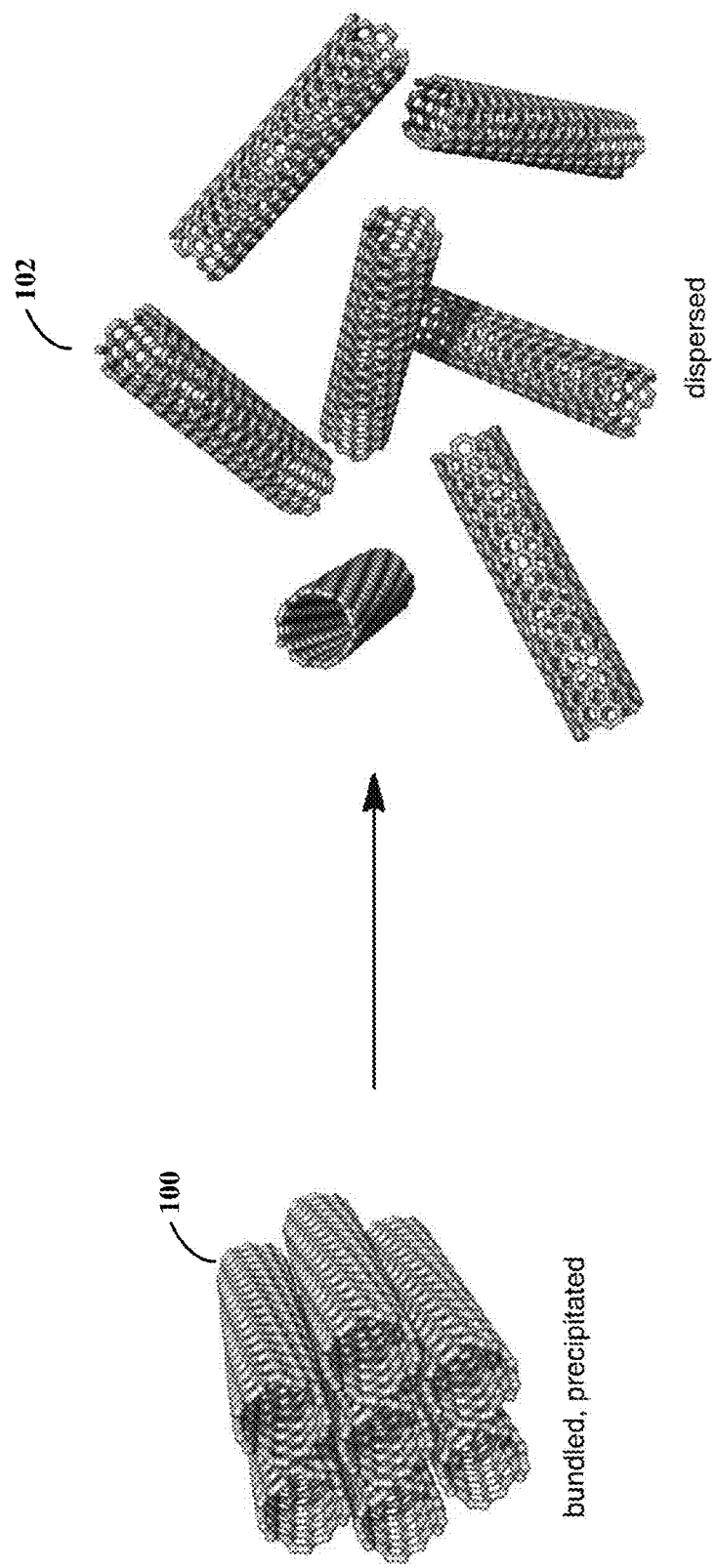
FIG. 1 shows an illustration of a bundled SWNT mixture in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of compounds, apparatuses, and methods involving isolating single walled carbon nanotubes (SWNTs), such as semiconducting SWNTs (S-SWNTs) or metallic SWNTs (M-SWNTs), using a supramolecular polymer. The present invention is believed to be applicable to a variety of different types of nanotube-based devices, and the invention has been found to be particularly suited for implementation with switching-type applications, such as field-effect transistors (FETs) and stretchable electronics. In various embodiments, the supramolecular polymer selectively disperses SWNTs of a particular electrical type, releases the SWNTs of the particular electrical type by disassembling into monomer or oligomer units, and subsequently reassembles into the supramolecular polymer for additional dispersions or other uses. While the present invention is not necessarily limited to such applications, various aspects of the invention may be appreciated through a discussion of various examples using this context.

SWNTs grow as a mixture of bundled SWNTs of two different electrical properties, S-SWNTs and M-SWNTs. For example, S-SWNTs or M-SWNTs are useful in a variety of applications, such as thin-film transistors, solar cells, or biological imaging. To harness their full potential, the M-SWNT and/or the S-SWNT are separated from the SWNT mixture. Selective synthesis, however, of S-SWNTs and/or M-SWNTs can exhibit undesirable results. Surprisingly, in accordance with various embodiments, a (H-bonded) supramolecular polymer is used to selectively disperse S-SWNTs or disperse M-SWNTs, which removes the need to selectively precipitate the SWNTs of a particular electrical type. The supramolecular polymer, in a number of embodiments, is disassembled into monomer units upon the addition of an H-bond-disrupting agent, resulting in a release of S-SWNTs or a release of M-SWNTs in a chemically pure form. The resulting selectively dispersed SWNTs of the particular electrical type are of a diameter and/or length such that ohmic contact is not difficult. Further, the separation of M-SWNTs from S-SWNTs is a complete separation, such that electronic devices, such as FETs or other switching devices, formed using the S-SWNTs (or M-SWNTS) do not have degrading on/off ratios. Further, the resulting M-SWNTSs, in accordance with various embodiments, may not becoming conducting again or have a reduction in becoming conducting again, which can cause shorts. Recovery from covalent alteration or functionalization may occur, for example, during annealing steps that are often involved in electronic-device processing. Moreover, various embodiments use inexpensive equipment, and are scalable to application to hundreds or thousands of nanotube-based FETs. In accordance with various embodiments, the M-SWNT and/or the S-SWNT are separated from a SWNT mixture using a supramolecular polymer and the supramolecular polymer is subsequently isolated.

S-SWNTs have attracted significant interest due to their extraordinary mechanical, optical, thermal, and electronic properties, making them attractive for a wide range of emerging technologies. Obtaining pure S-SWNTs via separation from their M-SWNT counterparts is advantageous for electronic and optoelectronic applications of S-SWNTs. Embodiments in accordance with the present disclosure result in SWNTs of a particular electrical property (e.g., an electronic type) and in a pure form, such as pure S-SWNTs or pure M-SWNTs. Various embodiments separate the SWNTs of the particular electrical type using a supramolecular polymer and without the use of special equipment, and result in high throughputs. Further, in various embodiments, the pure SWNTs of a particular electrical property is isolated from the supramolecular polymer and the supramolecular polymer is reused (e.g., recycled).

In accordance with various embodiments, a non-covalently linked-, so-called supramolecular polymer is used to separate the SWNTs of the particular electrical property. For example, the supramolecular polymer is used to reversibly disperse S-SWNTs or M-SWNTS that are larger in diameter than small diameter HiPco SWNTs, such as diameters of 0.6 nanometers (nm) to 2.2 nm. The supramolecular polymer, in various embodiments, is soluble in non-polar solvents, which promotes the selective dispersion of SWNTs. The use of polar solvents, on the other hand, promotes unselective SWNT dispersion, requiring additional steps to remove the M-SWNTs. In accordance with various embodiments, an H-bonded supramolecular polymer, as illustrated herein, selectively disperses large diameter (e.g., 0.8-2 nm or more) arc-discharge (AD) SWNTs with semiconducting purities, and releases the SWNTs upon triggered polymer disassembly. In various specific embodiments, the supramolecular polymer characterized by the plurality of monomer units is surprisingly able to selectively disperse SWNTs in a non-polar solvent or polar solvent. For example, the supramolecular polymer is soluble in the non-polar solvent, such as toluene or chloroform, and selectively disperses M-SWNTs and S-SWNTs in the non-polar solvent.

Definitions

As used herein, a supramolecular polymer is a polymer with monomer units held together by non-covalent bonds. The non-covalent forces that hold the supramolecular polymer together include coordination, $\pi$-$\pi$ interactions, and hydrogen bonding.

A back-bone of the supramolecular polymer, as used herein, includes a series of covalently bounded atoms that together create the continuous chain of the molecule. As used herein, a moiety is a part or a functional group of the polymer. A terminal is an end or extremity of the polymer and/or other molecule or compound. A side-chain, as used herein, is a branch off of the back-bone of the polymer (e.g., an R-group).

A monomer unit, as used herein, is a compound whose molecules join together to form the supramolecular polymer. Monomer units bind with one another to form the repeating chain molecule (e.g., the supramolecular polymer). An oligomer unit, as used herein, is a molecular complex that includes a few monomer units (but less than the supramolecular polymer).

As used herein, a mixture is a chemical composition of two or more substances that are mixed together, but are not chemically combined with one another, and are capable of being separated from one another. A complex, as used herein, is an entity including molecules in which the constituents maintain much of their chemical identity. A solution is a homogeneous mixture including two or more substances. For example, a solute is a substance dissolved in another substance, known as a solvent.

A precipitate, as used herein, is an insoluble solid that emerges from a liquid solution. A dispersion is a mixture in which particles of one substance are scattered throughout another substance. For example, dispersing includes separating particles of a substance throughout a solid, liquid or gas. By contrast, a nondispersed substance, as used herein, includes a substance that is not scattered throughout the other substance.

Turning now to the figures, FIG. 1 shows an illustration of a bundled SWNT mixture 100 and separation of the SWNTs of a particular electrical type 102. For example, the SWNTs in the SWNT mixture 100 include SWNTs of a first electrical type and SWNTs of a second electrical type that are bundled respectively together. The first and second electrical types, in various embodiments, include metallic and semiconducting.

Figure 2:
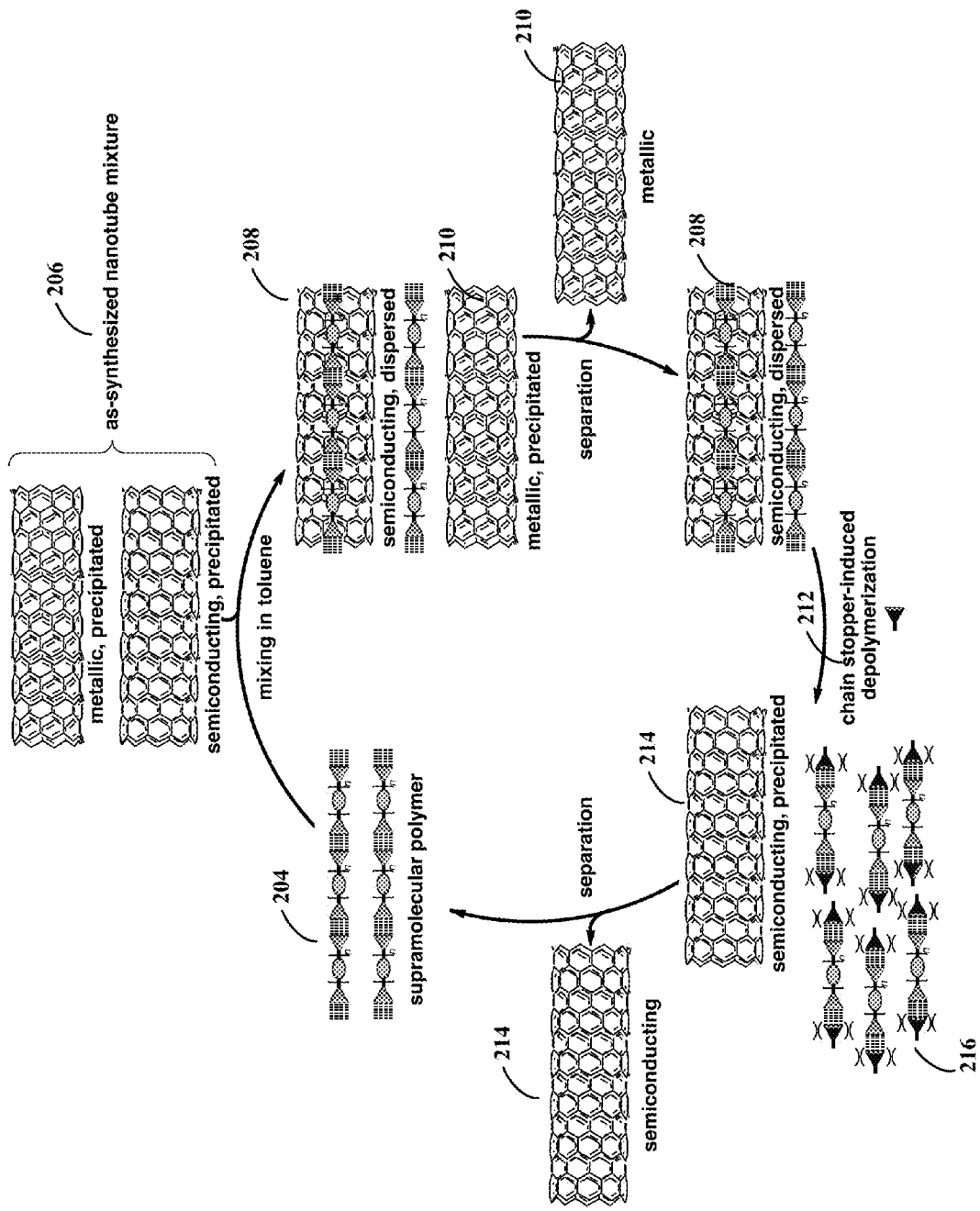
FIG. 2 shows an approach for isolating S-SWNTs in accordance with various embodiments.

FIG. 2 shows an example process for isolating SWNTs of a particular electrical type in accordance with various embodiments. As illustrated by FIG. 2, a supramolecular polymer 204 is added to a SWNT mixture 206, which includes M-SWNTs and S-SWNTs that are bundled together. As further illustrated, a solvent (e.g., toluene or chloroform) is combined with the supramolecular polymer 204 and the SWNT mixture 206 and the combined mixture is sonicated (and/or sonicated). The sonication, in various embodiments, includes ultrasonication. Adding the supramolecular polymer 204 forms a mixture of non-dispersed SWNTs of a first electrical type (e.g., M-SWNTs 210) and the supramolecular polymer 204 (e.g., non-dispersed/precipitated supramolecular polymer) and a dispersed complex 208 including dispersed SWNTs of a second electrical type (e.g., S-SWNTs) and the supramolecular polymer. That is, in various embodiments, a portion (e.g., a majority) of the supramolecular polymer remains precipitated with the non-dispersed SWNTs of the first electrical type (e.g., M-SWNTs 210).

For ease of reference, the following discussion generally refers to the SWNTs of the first electrical type as M-SWNTs 210 and the SWNTs of the second electrical type as S-SWNTs 214. However, as described in further detail herein, embodiments are not so limited and the SWNTs of the first electrical type can include S-SWNTs and the SWNTs of the second electrical type can include M-SWNTs.

In various embodiments, the mixture (e.g., the dispersed complex 208 and non-dispersed M-SWNTs 210 and non-dispersed supramolecular polymer) is centrifuged and/or filtered to remove the non-dispersed M-SWNTs 210 from the dispersed complex 208. This removes, for example, the M-SWNTs 210 from the S-SWNT (e.g., the supernatant) wrapped by supramolecular polymer 204 (e.g., the dispersed complex 208). The dispersed complex 208, in some embodiments, is characterized by dispersed S-SWNTs (or M-SWNTs) having a diameter of between 0.6 and 2.2 nm. Further, the dispersed S-SWNTs (or M-SWNTs) have a purity of between 80-99.99 percent. In various embodiments, the complex 208 is characterized by a ratio of supramolecular polymer 204 to SWNT mixture 206 of between 1 and 2.

A bond disrupting agent 212 is added to the dispersed complex 208 (e.g., the dispersion) of S-SWNTs 214 and supramolecular polymer 204 to disassemble the supramolecular polymer 204 and release the S-SWNTs 214 from the supramolecular polymer 204. The bond disrupting agent 212 disrupts hydrogen-bonds that bond the monomer units of the supramolecular polymer 204 to disassemble the supramolecular polymer. The supramolecular polymer disassembles 216, for example, into oligomer or monomer units. In various embodiments, the supramolecular polymer includes at least 25 monomer units and dissembles into oligomer units of four or less monomer units (or into monomer units) via the interaction of the supramolecular polymer 204 with the bond disrupting agent 212. In a number of specific embodiments, the supramolecular polymer includes 2,200 or more monomer units.

For example, in various specific embodiments, the bond disrupting agent 212 includes trifluoroacetic acid (TFA). In various embodiments, 1% of TFA is added to the solution to cause polymer disassembly and SWNT precipitation. This allows for the S-SWNTs 214 to be isolated in a pure form after filtration. The S-SWNTs are isolated from the dissembled supramolecular polymer 216 and the bond disrupting agent 212. In a particular example, the isolation includes filtering the S-SWNTs 214 from a mixture including the S-SWNTs 214, the disassembled supramolecular polymer 216, and the bond disrupting agent 212. Alternatively and/or in addition, the isolation includes centrifuging the mixture.

In a number of embodiments, the supramolecular polymer 204 is isolated. For example, a solution that includes the disassembled supramolecular polymer 216 and the bond-disrupting agent 212 is provided. Providing the solution, in various specific embodiments, includes providing (e.g., purchasing, receiving, or forming) a dispersed complex 208 that includes the supramolecular polymer and the S-SWNTs and/or the non-dispersed M-SWNTs 210 and the non-dispersed supramolecular polymer. In various embodiments, providing the solution includes providing a mixture that includes the dispersed complex 208 with the non-dispersed M-SWNTs 210 and non-dispersed supramolecular polymer. The bond disrupting agent 212 is added to the dispersed complex 208 to disassemble the supramolecular polymer and the SWNTs are isolated, such as provided above. In some embodiments, the non-dispersed M-SWNTs 210 and non-dispersed supramolecular polymer are removed, as previously described, and then the S-SWNTs are isolated. In other related embodiments, the solution is provided by isolating SWNTs from a SWNT mixture 206, as described above, by adding the supramolecular polymer 204 to the SWNT mixture and disassembling the supramolecular polymer using the bond disrupting agent 212.

An antisolvent is added to the solution that includes the disassembled supramolecular polymer 216 and the bond disrupting agent 212 to precipitate the supramolecular polymer 204. The antisolvent, in various embodiments, includes methanol. In response to the precipitation, in various embodiments, the supramolecular polymer 204 is isolated from the bond disrupting agent (and the antisolvent). The isolation includes, for example, centrifuging the mixture (e.g., a mixture including the supramolecular polymer 216, bond disrupting agent 212, and the antisolvent) to remove the bond disrupting agent 212 and/or filtering the precipitated supramolecular polymer 204 from a solution including the bond disrupting agent 212 and the antisolvent. Because the supramolecular polymer 204 is isolated, the supramolecular polymer 204 can be used for further purposes, such as additional SWNT isolations.

As previously discussed, in various embodiments, a portion (e.g., a majority) of the supramolecular polymer remains precipitated with the SWNTs of the first electrical type, such as the non-dispersed M-SWNTs 210 and/or SWNTs with reduced S-SWNT content. The portion of the supramolecular polymer is isolated by adding a solvent with the bond disrupting agent causing the supramolecular polymer to dissolve in solution and the non-dispersed SWNTs of the first electrical type remain precipitated. The non-dispersed SWNTs of the first electrical type are filtered from the solution to isolate the SWNTs of the first electrical type. The supramolecular polymer is precipitated with an antisolvent and filtered to isolate the supramolecular polymer.

Alternatively and/or in addition, in accordance with various embodiments of the present disclosure, the M-SWNTs are isolated from the SWNT mixture 206. For example, a supramolecular polymer 204 is added to a SWNT mixture 206 that includes M-SWNTs and S-SWNTs bundled together. A solvent (e.g., toluene or chloroform) is combined with the supramolecular polymer 204 and the SWNT mixture 206, and the combined mixture is sonicated. Adding the supramolecular polymer 204 forms a mixture of non-dispersed S-SWNTs and non-dispersed supramolecular polymer 204, and a dispersed complex including the M-SWNTs and the supramolecular polymer 204. The mixture is centrifuged to remove the non-dispersed S-SWNTs from the dispersed complex. This can remove, for example, the M-SWNT (e.g., the supernatant) wrapped by supramolecular polymer.

More specifically, in various embodiments, a bond disrupting agent is added to the dispersed complex of M-SWNTs and supramolecular polymer to disassemble the supramolecular polymer and release the M-SWNTs from the supramolecular polymer. The bond disrupting agent disrupts hydrogen-bonds that bond the monomer units of the supramolecular polymer to disassemble the supramolecular polymer. This allows for the M-SWNTs to be isolated in their pure form after filtration. For example, the M-SWNTs are isolated from the dissembled supramolecular polymer 216 and the bond disrupting agent 212. In a particular example, the isolation includes filtering the M-SWNTs from a mixture including the M-SWNT, the disassembled supramolecular polymer 216, and the bond disrupting agent 212 and/or centrifuging the mixture.

In various specific embodiments, the isolated SWNTs of the second electrical type are characterized by a purity and a yield based on dispersion parameters. The dispersion parameters include settings related to the sonication and/or centrifugation. Example dispersion parameters include a ratio of the supramolecular polymer to SWNT mixture, concentration of the SWNTs, sonication power, and sonication time, among other parameters, such as centrifugation parameters that include speed, temperature, and time of centrifugation. The dispersion parameters are varied, in various embodiments, to adjust the properties of the isolated SWNTs. For example, the dispersion parameters are adjusted to select the purity and/or yield of the SWNT dispersion (e.g., the isolated SWNTs of the second electrical type). In various specific embodiments, the purity is optimized by using a ratio of supramolecular polymer to SWNT mixture of between 1 and 2 and a sonication power of 30% for 20 minutes, although embodiments are not so limited.

In other related and specific embodiments, the isolated SWNTs are used for forming various circuitry. Example circuitry includes electronic circuitry selected from the group consisting of: transistors, stretchable electronics, flex circuits, flex transistors, thermal electronics, transparent electronics, display screens, solar panels, heaters and speakers, among other circuits. For example, the SWNTs of the second electrical type can be re-dispersed by adding a dipolar aprotic solvent, such as NMP. Further, the isolated SWNTs of the second electrical type can be used to form films that are used to form and/or make the circuitry. And, in some embodiments, the isolated SWNTs of the second electrical type can be doped and/or used to form a resistor, such as for used in heaters and speakers. In various embodiments, the SWNTs are doped with other elements such as metals, boron and nitrogen. For example, the doped isolated SWNTs change resistance in response to vibrations applied.

Figure 3A:
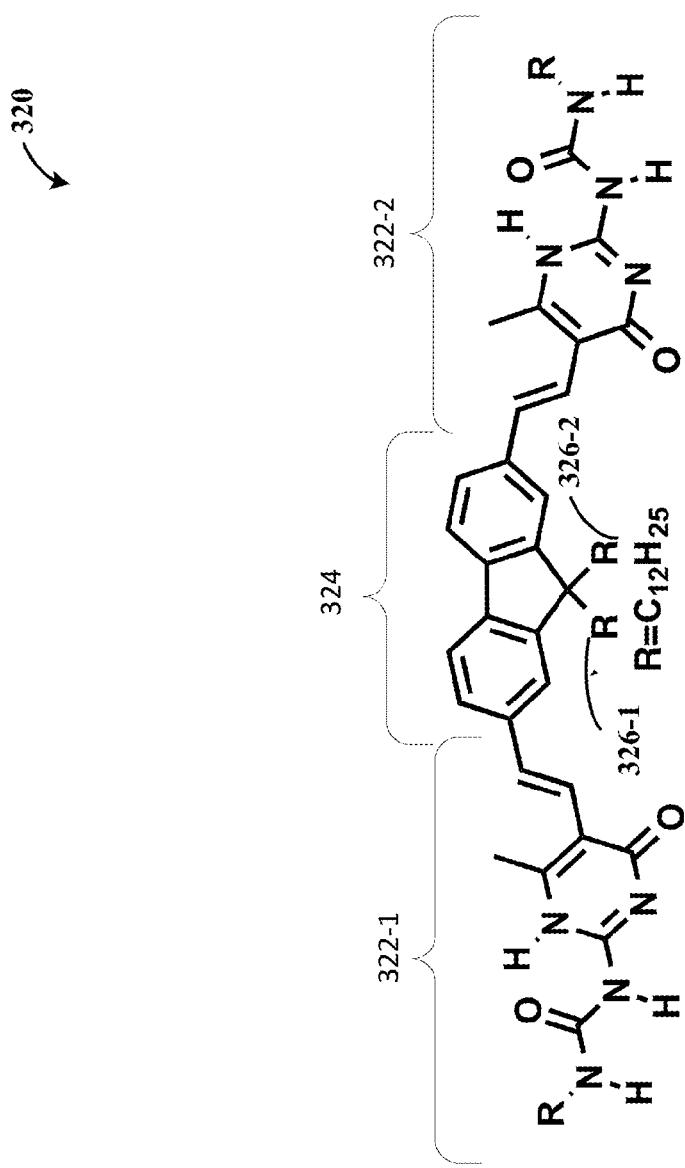

FIGS. 3A-3C show examples of monomer units of a supramolecular polymer, in accordance with other example embodiments. As illustrated, the supramolecular polymer includes a plurality of monomer units (such as fluorine-based monomer units) that are non-covalently linked to form the supramolecular polymer.

Each monomer unit is characterized by ureido pyrimidione moiety (UPy) terminals, a moiety in the back-bone, and carbon side-chains. The UPy terminals are linked via alkyne or alkene linkages to the back-bone. In various embodiments, the moiety in the back-bone includes a fluorene moiety, a thiophene moiety, a benzene moiety, a carbazole moiety, an isoindigo moiety, a benzodithiophene moiety, thienothiophene moiety, perylene diimide moiety, a diketopyrrolopyrrole moiety, a enantiopure binaphthol moiety and an oligomer or combination of two or more of the above moieties in the back-bone, some of which may not be fully conjugated. For example, a thiophene, benzene, carbazole, isoindigo moiety in the back-bone is used to isolate S-SWNTs of various selectivity. An enantiopure binaphthol moiety in the back-bone is used to isolate enantioenriched S-SWNTs, in some embodiments. A supramolecular polymer with an enantiopure binaphthol moiety in the back-bone can include a helically chiral supramolecular polymer. Further, in some embodiments, the supramolecular polymer includes a polar group on a portion of the polymer, which is used to isolate M-SWNTs. For example, the polar group is a portion of the back-bone and/or otherwise branches from the moiety in the back-bone of the monomer units. Example polar groups include esolene, ammonia groups, sufinate, and other charged groups.

In various embodiments, the supramolecular polymer characterized by the plurality of monomer units is surprisingly able to selectively disperse SWNTs in a non-polar or polar solvent. For example, the supramolecular polymer is soluble in the non-polar solvent, such as toluene or chloroform, and selectively disperses SWNTs of a particular electrical type in the non-polar solvent. In a number of embodiments, the supramolecular polymer disperses SWNTs of the particular electrical type from a SWNT mixture that contains SWNTs of at least two electrical types (e.g., M-SWNTs and S-SWNTs) that are bundled together. Further, the supramolecular polymer releases the SWNTs of the particular electrical type by disassembling into oligomer or monomer units and subsequently reassembles into the supramolecular polymer after isolation of the particular SWNTs. As a specific example, the supramolecular polymer selectively disperses the SWNTs of a particular electrical type from the SWNT mixture, disassembles into oligomer units or monomer units responsive to interaction with a bond-disrupting agent to release the SWNTs of the particular electrical type, and subsequently, reassembles into the supramolecular polymer in response to interaction of the disassembled oligomer or monomer units and an antisolvent.

As illustrated by FIG. 3A, in various embodiments, the monomer unit 320 of the supramolecular polymer includes a fluorene moiety 324 back-bone. For example, the monomer unit 320 is characterized by the following features:

1) Terminal 2-ureido-6[1H]-pyrimidinone moieties (UPy) 322-1, 322-2 that self-associate with (very high) dimerization constants to enable formation of high molecular-weight supramolecular polymers even at low monomer concentrations. This can be beneficial, as oligomer units with above around 25 fluorene units are useful to achieve stable SWNT dispersions. On the other hand, in various embodiments, the release of SWNTs occurs due to polymer degradation into assemblies with less than 4 fluorene units, which can be achieved via addition of trifluoroacetic acid (TFA). TFA is an agent that is effective in disrupting hydrogen bonds;

2) A fluorene moiety 324 in the backbone to promote selectivity between S-SWNTs and M-SWNTs. Alternatively, as discussed above, the back-bone can be characterized by a thiophene, benzene, carbazole, isoindigo, or enantiopure binaphthol moiety, among other moieties;

3) Long —$C_{12}H_{25}$ side chains 326-1, 326-2 to enhance polymer solubility and SWNT dispersion yields; and 4) A flat molecular surface to facilitate π-π interactions with SWNTs.

As illustrated by FIG. 3B, in various embodiments, the monomer unit 330, 332 of the supramolecular polymer includes an enantiopure binaphthol moiety back-bone. As previously discussed, an enantiopure binaphthol moiety in the back-bone is used to isolate enantioenriched S-SWNTs. A supramolecular polymer with an enantiopure binaphthol moiety in the back-bone includes a helically chiral supramolecular polymer. Thereby, as illustrated by FIG. 3B, the enantiopure binaphthol moiety includes R 332 (e.g., right-form), S 330 (e.g., left-form), or a combination of both (e.g., racemic). That is, in some embodiments, the supramolecular polymer is a BINOL-based chelically chiral supramolecular polymer.

In accordance with a number of embodiments, M-SWNTs are isolated from the SWNT mixture. In such embodiments, as illustrated by FIG. 3C, the monomor unit of the supramolecular polmer includes one or more polar groups 338-1, 338-2 on a portion of the polymer, such as in the back-bone 340 of the monomer unit.

According to various specific embodiments, the supramolecular polymer is reassembled and isolated after isolating the SWNTs of the particular electrical type. For example, the SWNTs are isolated by adding the supramolecular polymer to a SWNT mixture to form a mixture of non-dispersed SWNTs of a first electrical type and non-dispersed supramolecular polymer and a dispersed complex. The supramolecular polymer and the SWNT mixture is combined in a solvent, such as toluene or chloroform, and the combined mixture is sonicated. The dispersed complex includes SWNTs of a second electrical type bundled with the supramolecular polymer. The non-dispersed SWNTs of the first electrical type are removed (e.g., separated from the dispersed complex and the non-dispersed supramolecular polymer) and a bond-disrupting agent is added to the dispersed complex. The bond-disrupting agent, in various embodiments, includes TFA. The bond-disrupting agent disassembles the supramolecular polymer to release the SWNTs of the second electrical type from the supramolecular polymer and the SWNTs of the second electrical type are isolated from a solution of the disassembled polymer and the bond-disrupting agent.

After isolating the SWNTs of the second electrical type, the supramolecular polymer is precipitated by adding an antisolvent to the solution of the disassembled supramolecular polymer and the bond-disrupting agent. The antisolvent, in various embodiments, is methanol. For example, the antisolvent reacts with the disassembled supramolecular polymer to reassemble the supramolecular polymer from the disassembled oligomer units or monomer units to the supramolecular polymer (e.g., forming non-covalent links between the monomer units and/or the oligomer units). The precipitated supramolecular polymer is isolated from the bond-disrupting agent and the antisolvent. For example, the isolation includes centrifuging including the disassembled supramolecular polymer and the bond disrupting agent (and the antisolvent) to remove the solution containing the bond disrupting agent and the antisolvent, and/or filtering the precipitated supramolecular polymer from the solution.

In various embodiments, in addition and/or alternatively, the supramolecular polymer is isolated from a residue including the non-dispersed SWNTs of the first electrical type and non-dispersed supramolecular polymer. As previously discussed, in some embodiments, a portion (e.g., a majority) of the supramolecular polymer remains precipitated with the non-dispersed SWNTs of the first electrical type (e.g., M-SWNTs and/or S-SWNTS with reduced S-SWNT content). The portion of the supramolecular polymer that is non-dispersed is isolated by adding a solvent with a bond disrupting agent, such as TFA, causing the supramolecular polymer to dissolve in solution and the non-dispersed SWNTs of the first electrical type remain precipitated. The non-dispersed SWNTs are filtered to isolate the SWNTs of the first electrical type. The supramolecular polymer in the polymer-bond disrupting agent solution is precipitated and isolated by adding an antisolvent, such as methanol, and filtering to isolate the supramolecular polymer.

Figure 4:
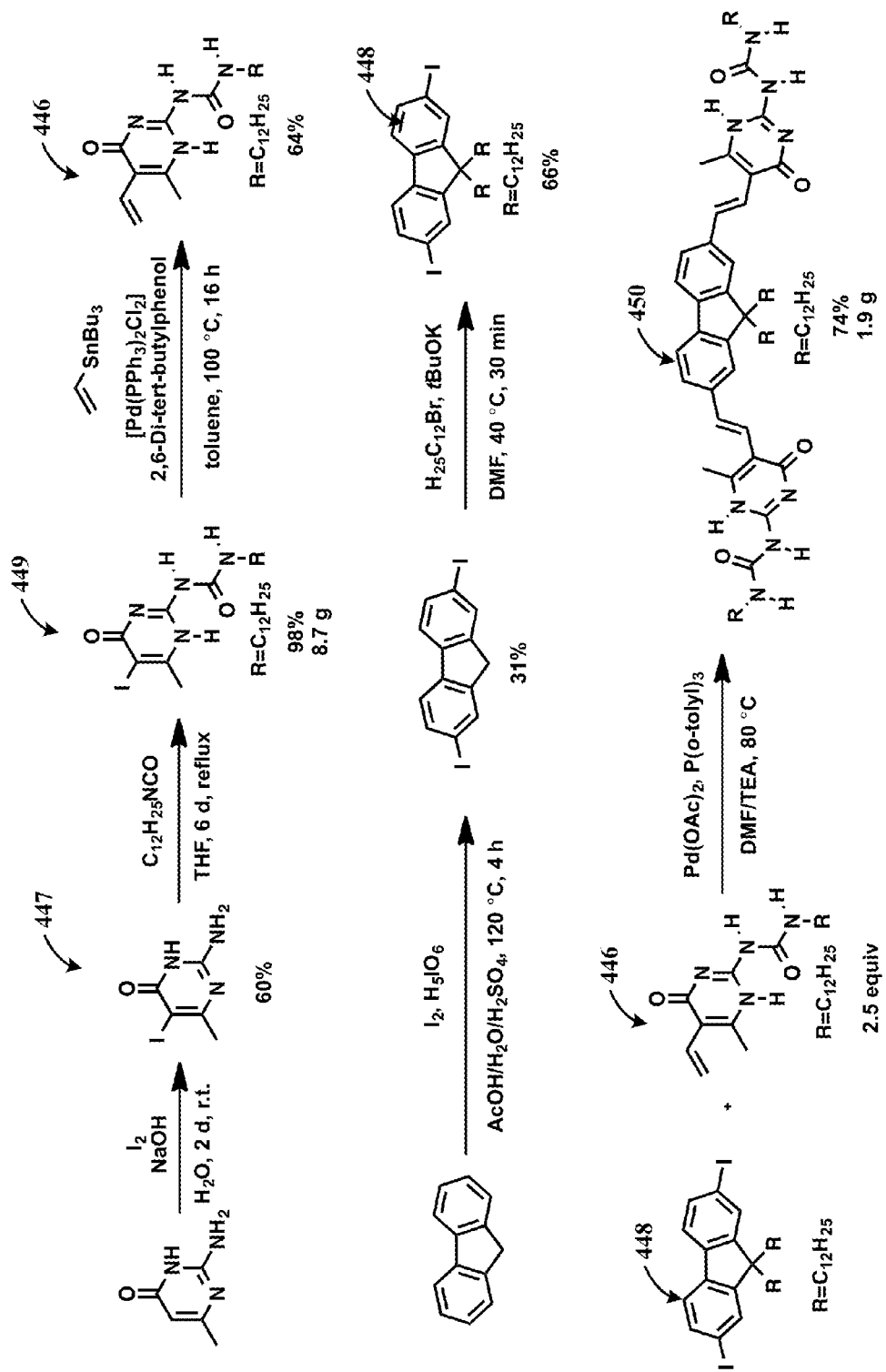
FIG. 4 illustrates an example process for synthesizing a supramolecular polymer, in accordance with various embodiments.

FIG. 4 illustrates an example process for synthesizing a supramolecular polymer 450, in accordance with another example embodiment. For example, the top line of FIG. 4 illustrates an example process for synthesizing vinyl UPy 446 and the middle line illustrates synthesizing diiodo-fluorene 448. The bottom line of FIG. 4 illustrates synthesizing the supramolecular polymer 450. As illustrated, the synthesis of the supramolecular polymer 450 can be achieved via Heck coupling between vinyl UPy 446 and diiodo-fluorene 448 on a 2 g scale.

For example, the supramolecular polymer 450 is formed by forming vinyl UPy 446. Vinyl UPy 446 is formed by reacting iodocytosine 447 with dodecyl isocyanate. In various embodiments, vinyl UPy 446 is synthesized in multiple processes from iodocytosine 447. For example, iodocytosine 447 is reacted with dodecyl isocyanate to yield iodo-UPy 449. And, iodo-UPy 449 is converted into vinyl UPy 446 via Stille coupling with tributyl(vinyl)stannane. For additional specific and general information on forming iodo-UPy 449 and the moiety 448, see Appendix C of the underlying provisional application entitled "Supporting Information"; Maki, M. S.; Pfeifer, T.; Studer, A., *Chem. Eur. J.,* 2010, 16, 5872 and Wierenga, W.; Skulnick, H. I.; Stringfellow, D. A.; Weed, S. D.; Renis, H. E.; Eidson, E. E, *J. Med. Chem.,* 1980, 23, 237.

Further, the vinyl UPy 446 is reacted with a moiety 448. The moiety, as described above, includes one of a fluorene moiety, a thiophene moiety, a benzene moiety, a carbazole moiety, a isoindigo moiety, and a enantiopure binaphthol moiety. For example, in various embodiments, reacting the vinyl UPy 446 with the moiety 448 includes suspending the UPy and the moiety 448 in a polar solvent. The polar solvent, in various embodiments, includes dimethylformamide (DMF). Further, the suspension, in various embodiments, of the vinyl UPy 446 and the moiety 448 is in DMF and triethylamine (TEA) under N2 atmosphere. A solid is formed by degassing and heating a mixture that includes the vinyl UPy 446, the moiety 448, and the polar solvent. In various specific embodiments, the solid is formed by degassing the mixture, adding Pd(AOc)2 and tri(o-tolyyl)phosphine to the mixture, stirring the mixture and heating for a period of time, filtering hot, and concentrating in a vacuum. Further, the supramolecular polymer 450 is formed by dissolving the solid in another solvent and precipitating the supramolecular polymer with 450 methanol (MEOH). The other solvent, in various embodiments, includes chloroform. The precipitated supramolecular polymer, in various embodiments, is filtered and washed with methanol. In various embodiments, the re-precipitation procedure is repeated to form the supramolecular polymer 450.

The resulting supramolecular polymer 450, as previously discussed, is configured to selectively disperse SWNTs of a particular electrical type from a SWNT mixture. In various embodiments, the supramolecular polymer 450 disperses SWNTs of the particular electrical type that have a diameter of between 0.6 and 2.2 nm and include a purity between 80-99.99 percent. Furthermore, the supramolecular polymer is configured to depolymerize in the presence of a bond-disrupting agent to form oligomer or monomer units and/or to reassemble into the supramolecular polymer in response to an interaction of the disassembled oligomer or monomer units and an antisolvent.

More Specific/Experimental Embodiments

Figure 5A:
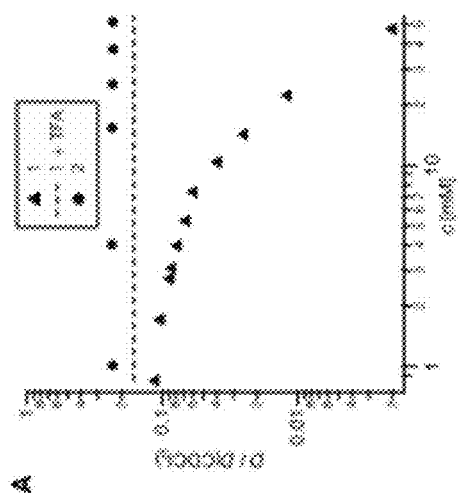
FIGS. 5A-5F illustrate examples of isolation of S-SWNTs, in accordance with various embodiments.

FIGS. 5A-5F illustrate examples of isolating SWNTs in accordance with various embodiments of the present disclosure. The ability to form a supramolecular polymer in a solution is assessed, in various more specific/experimental embodiments, by diffusion-ordered nuclear magnetic resonance (NMR) spectroscopy (DOSY) in $CDCl_3$. The DOSY technique enables determination of diffusion coefficients, which are inversely related to the molecular weights of investigated entities. While the relative diffusion coefficient $D/D(CDCl_3)$ of reference compound (e.g., vinyl UPy 446 illustrated by FIG. 4), which is present as a hydrogen-bonded dimer, is constant over the concentration range, $D/D(CDCl_3)$ of the bifunctional compound (e.g., the supramolecular polymer 450 illustrated by FIG. 4) decreases with increasing concentration, indicating polymeric behavior, as illustrated by FIG. 5A. FIG. 5A illustrates the relative diffusion coefficients of the supramolecular polymer and the vinyl UPy in $CDCl_3$ as a function of their concentrations. Thus, at c=50 millimolar (mM), at which the supramolecular polymer produces a viscous solution, the molar weight is M 2600000 g mole $(mol)^{-1}$, which corresponds to an association of N≈2200 monomeric units. As the release of dispersed SWNTs from the supramolecular polymer necessitates its disassembly into monomer or oligomer units, in various embodiments, observation of whether the addition of TFA causes depolymerization of the supramolecular polymer is conducted. For example, the addition of small quantities of TFA leads to an increase of $D/D(CDCl_3)$ to 0.16. This number corresponds to a molecular weight of M≈1308 g $mol^{-1}$, which is in agreement with the molecular weight M=1224 g $mol^{-1}$ of monomeric unit of the supramolecular polymer.

In various experimental embodiments, after preparing and characterizing the supramolecular polymer, the ability of the supramolecular polymer to disperse S-SWNTs is identified. A SWNT mixture, such as P2-SWNTs, is used. The dispersion is performed in toluene, as toluene cannot disperse S-SWNTs on its own. In various embodiments, the supramolecular polymer/SWNT mixture is tip-sonicated for a given amount of time at a given sonication power, and then centrifuged for 30 minutes at 17000 rotations-per-minute (rpm). The solution (e.g., supernatant of S-SWNT) is removed and analyzed by absorption spectroscopy, which provides information about the yield and purity of the obtained SWNT dispersion. Because the supramolecular polymer is removed from the dispersed SWNTs (vide infra), a quantity of the SWNT dispersion yield is measured based on the mass of released SWNTs and correlation of it to the peak absorption. In various embodiments, while absolute quantification of the S/M-SWNT ratio via absorption spectroscopy may not be obtained, the $\phi$ value is used as a relative measure for the S-SWNT purity. Thereby, higher $\phi$ values represent higher overall SWNT contents and correlate with higher S-SWNT purities; $\phi$ values of 0.40 are attributed to S-SWNT contents of over 99%.

Figure 5B:
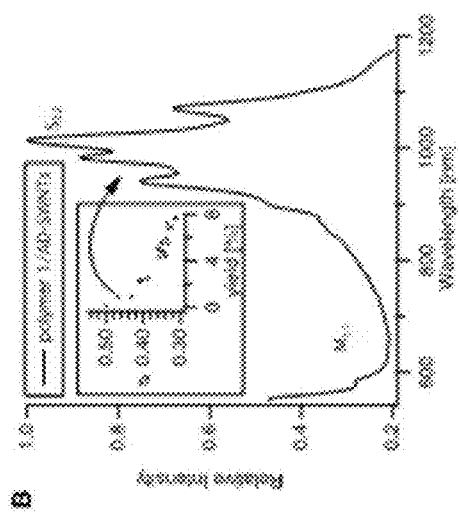
Figure 16:
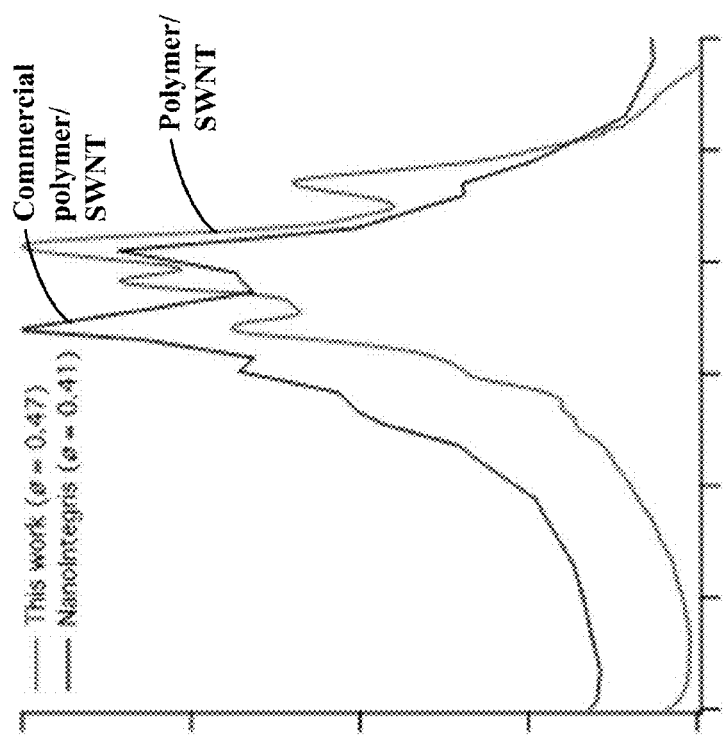
FIG. 16 illustrates an example of an absorption spectra of isolated SWNTs of a particular electrical type and isolated under particular dispersion parameters, in accordance with various embodiments.

Modification of dispersion parameters, including supramolecular polymer/SWNT mixture ratio, SWNT concentration, sonication power, and sonication time, affect the yield and purity of the obtained SWNT dispersions. Plotting the obtained $\phi$/yield-pairs shows an inverse relationship between such quantities, as illustrated by FIG. 5B. FIG. 5B shows the absorption spectrum obtained with dispersion parameters optimized towards purity (5 milligram (mg) AD SWNTs, 5 mg supramolecular polymer, 20 minutes sonication at 30% power), with $\phi$=0.47 and 0.9% yield. The peaks in the range of 800-1200 nm (e.g., $S_{22}$) correspond to the transitions of S-SWNTs. The absence of peaks in the range of 600-800 (e.g., $M_{11}$) nm attributed to transitions of M-SWNTs supports the S-SWNT purity of the sample. In fact, the $\phi$ value of 0.47 is significantly higher than that of commercially available 99.9% S-SWNTs (e.g., as illustrated by FIG. 16).

Figure 5C:
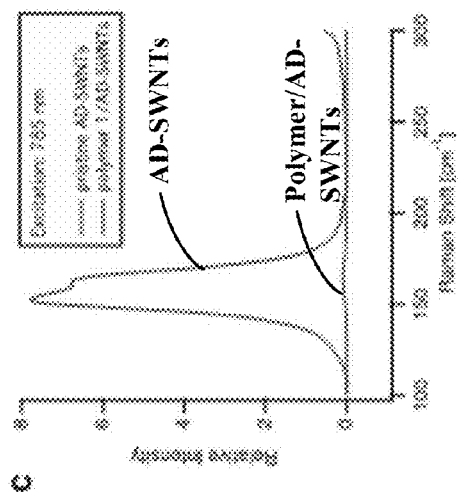
Figures 5D, 5E, 5F:
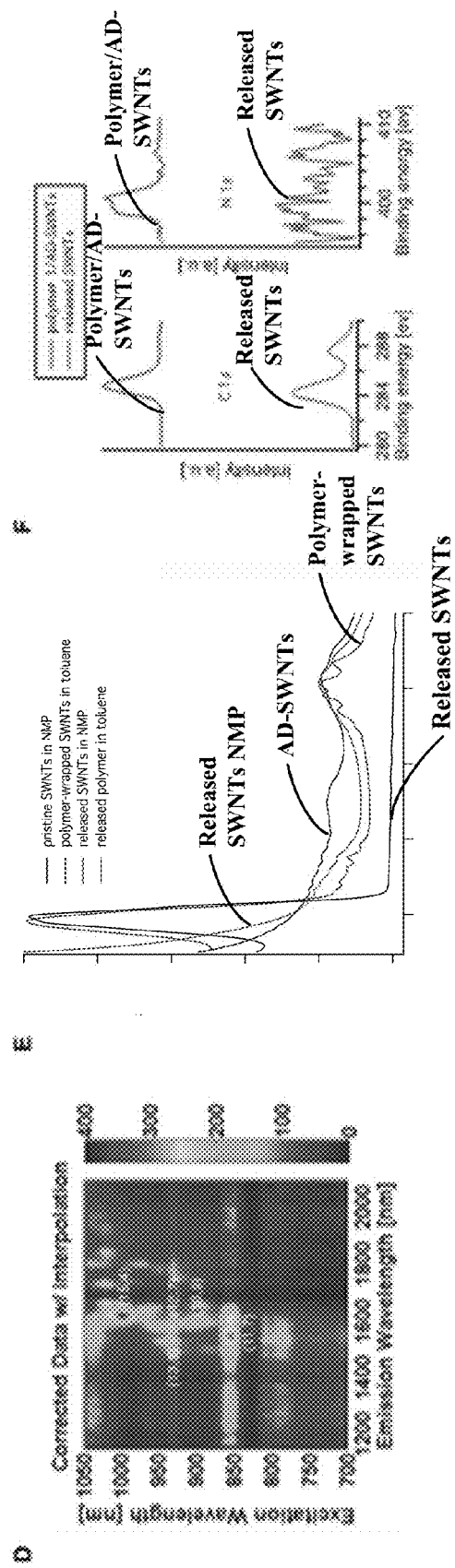

The S-SWNT enrichment for higher $\phi$ values, in various embodiments, is confirmed by Raman spectroscopy: the M-SWNTs radial breathing mode (RBM) peaks in the 100-200 centimeters $(cm)^{-1}$ region probed with a 785 nm laser are essentially not present in the SWNT sample dispersed by the supramolecular polymer, as illustrated by FIG. 5C. FIG. 5C illustrates the Raman spectrum of the RBM region of pristine and the supramolecular polymer dispersed AD-SWNTs. A photoluminescence vs. excitation (PLE) map is recorded in order to assign the individual chiral indexes of the dispersed SWNTs, as illustrated by FIG. 5D. FIG. 5D, illustrates photoluminescence vs. excitation PLE map of the supramolecular polymer/AD-SWNT dispersion in toluene. At least twelve SWNTs contribute to the overall spectrum. The two strongest signals are tentatively assigned to the (15,4) and (11,7) tubes as illustrated by FIG. 5D. The exemplified diameters of the five most abundant SWNTs are in the range of 1.28-1.39 nm, while the exemplified diameter range of all twelve identified SWNTs is 1.25-1.52 nm.

Figure 15:
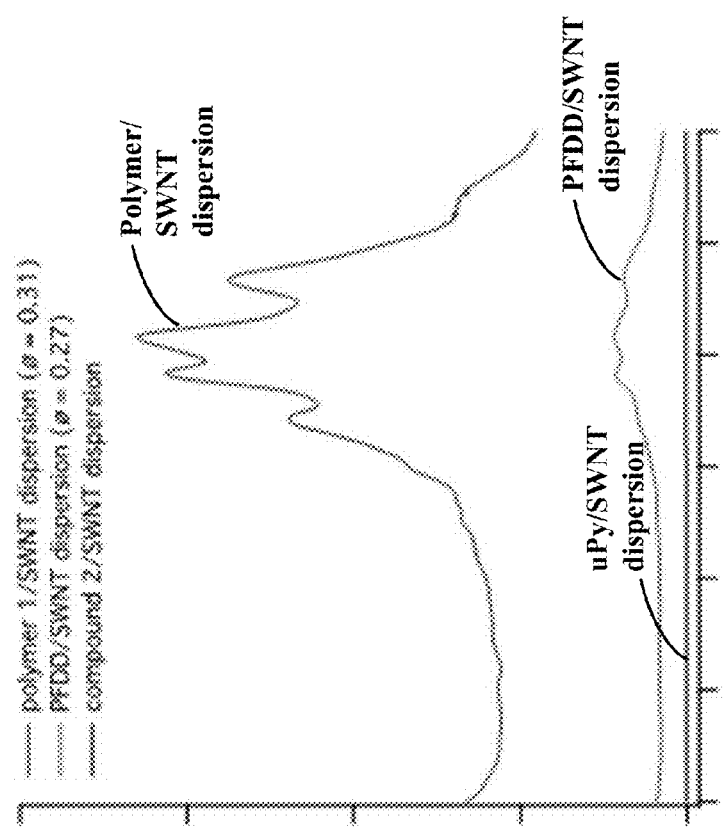
FIG. 15 illustrates an example of an absorption spectra of isolated SWNTs of a particular electrical type, in accordance with various embodiments.
Figure 17A:
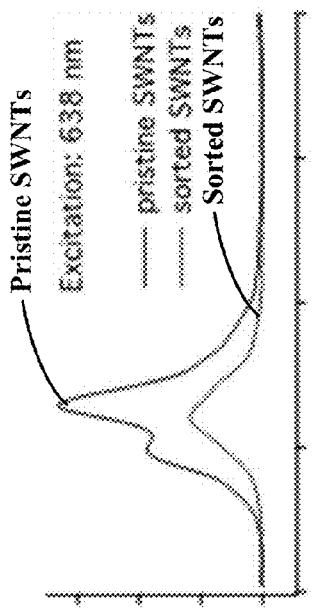
FIGS. 17A-17D illustrate examples of spectra of pristine and sorted SWNTs at various excitation waves, in accordance with various embodiments.
Figure 17B:
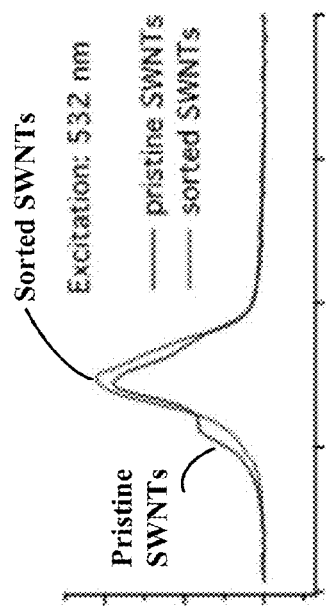
Figure 17C:
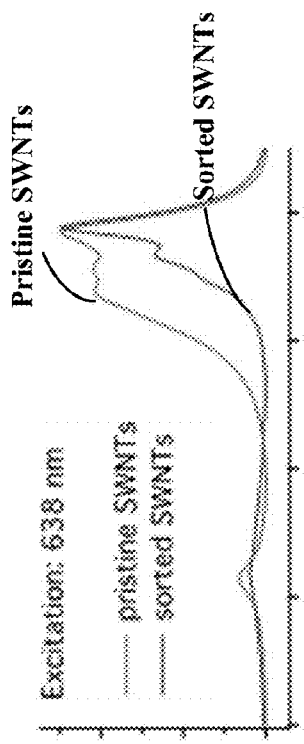
Figure 17D:
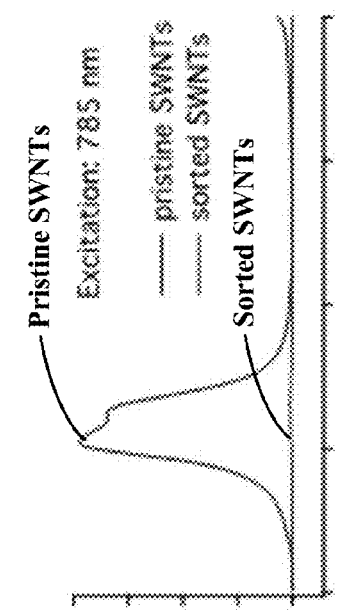

Monofunctional UPy compound (e.g., compound 446 as illustrated by FIG. 4), as well as short, oligomer fluorene derivatives are not able to disperse SWNTs. This is attributed to the ability of supramolecular polymer to disperse SWNTs and to its presence as a supramolecular polymer. Compared to the corresponding conventional polymer, poly (9,9-di-n-dodecylfluorene) (PFDD), the supramolecular polymer achieves about or approximately a 7-fold higher SWNT dispersion yield and a higher S-SWNT purity under the same dispersing conditions (5 mg SWNT, 5 mg polymer, sonication for 30 minutes at 70% power; $\phi$=0.31 for supramolecular polymer vs. $\phi$=0.27 for PFDD, as illustrated by FIG. 15).

Release of the enriched S-SWNTs is achieved via addition of 1% TFA to the supramolecular polymer/SWNT dispersion, resulting in SWNT precipitation. By contrast, SWNT precipitation from the PFDD/SWNT dispersion may not occur even upon addition of 3% TFA. Thus, the TFA-assisted SWNT release from the supramolecular polymer can be attributed to the supramolecular polymer's disassembly into monomeric units. The precipitated SWNTs are filtered over a 0.2 μm polytetrafluorethylene (PTFE) membrane, washed with toluene, and dried in air. The absorption spectrum of the filtrate shows signals attributed to the supramolecular polymer and no SWNT signals, meaning that SWNT release from supramolecular polymer is quantitative, as illustrated by FIG. 5E. FIG. 5E illustrates an absorption spectra demonstrating S-SWNT enrichment upon dispersion with the supramolecular polymer, and quantitative separation of S-SWNTs after disassembly of the supramolecular polymer with TFA. The supramolecular polymer, in various embodiments, is re-isolated by precipitation with MeOH, allowing its reuse in future SWNT dispersions. The filtered SWNTs can be re-dispersed in NMP, which is a solvent that unselectively disperses SWNTs without any surfactants. Compared to the absorption spectrum of a pristine AD SWNT sample in N-Methyl-2-pyrrolidone (NMP), the released SWNT sample shows no and/or minimal metallic SWNT signals in the 600-800 nm region, as illustrated by FIG. 5E. The released sample also shows no/minimal signals in the supramolecular polymer region at 320-450 nm, demonstrating that the polymer removal is quantitative. Quantitative removal of the supramolecular polymer can also be illustrated by X-ray photoelectron spectroscopy (XPS): the N is peak attributed to the N-atoms in the supramolecular polymer was not present any more in the released SWNT sample, as illustrated by FIG. 5F. FIG.

5F illustrates an XPS on the supramolecular polymer dispersed and released SWNT samples.

In accordance with various embodiments, an H-bonded supramolecular polymer selectively disperses and then release S-SWNTs, presenting a significant advantage over covalent polymers. The ability to obtain S-SWNTs in their pure form allows S-SWNTs to be re-dispersed in other solvents using other dispersing agents, making the S-SWNTs more versatile than polymer-wrapped SWNTs. At the same time, a UPy precursor can be conveniently attached to a halogenated π-conjugated system via cross-coupling chemistry.

The synthesis of the supramolecular polymer, in various embodiments, involves preparation of precursor vinyl UPy. Vinyl UPy is synthesized in multiple processes from iodo-cytosine (compound 447 illustrated by FIG. 4). For example, iodocytosine (compound 447 illustrated by FIG. 4) is reacted with dodecyl isocyanate to yield iodo-UPy. And, iodo-UPy is converted into vinyl UPy via Stille coupling with tributyl(vinyl)stannane.

In various experiment embodiments, the supramolecular polymer is synthesized using various reagent grade chemicals that are used without further purification. For example, solvents are degassed by bubbling N2 through the solution for 30 min. In a number of embodiments, 1H NMR and 13C NMR spectra are recorded on a Mercury 400 or Inova 600 spectrometer at 298 K and residual solvent peaks are used as internal references. In various embodiments, mass spectra, such as high-resolution electron impact mass spectra, is measured on a Waters Micromass AutoSpec Ultima spectrometer. For example, high-resolution matrix-assisted laser-desorption-ionization mass spectra can be measured on a Varion Ionspec Ultima MALDI-FTICR mass spectrometer using 3-hydroxypyridine-2-carboxylic acid (3-HPA) as matrix or on Bruker Daltonics Ultraflex II MALDI-TOF mass spectrometer using (2-[(2E)-3-(4-t-butylphenyl)-2-methylprop-2-enylidene]malononitrile) (DCTB) as matrix. In a number of specific embodiments, high-resolution electro-spray-ionisation mass spectra are measured on a Bruker Daltonics maXis spectrometer.

The following is an example embodiment for synthesizing a supramolecular polymer characterized by the following:

1,1'-(((1E,1'E)-(9,9-didodecyl-9H-fluorene-2,7-diyl)bis (ethene-2,1-diyl))bis(6-methyl-4-oxo-1,4-dihydropyrimi-dine-5,2-diyl))bis(3-dodecylurea).

Figure 6A:
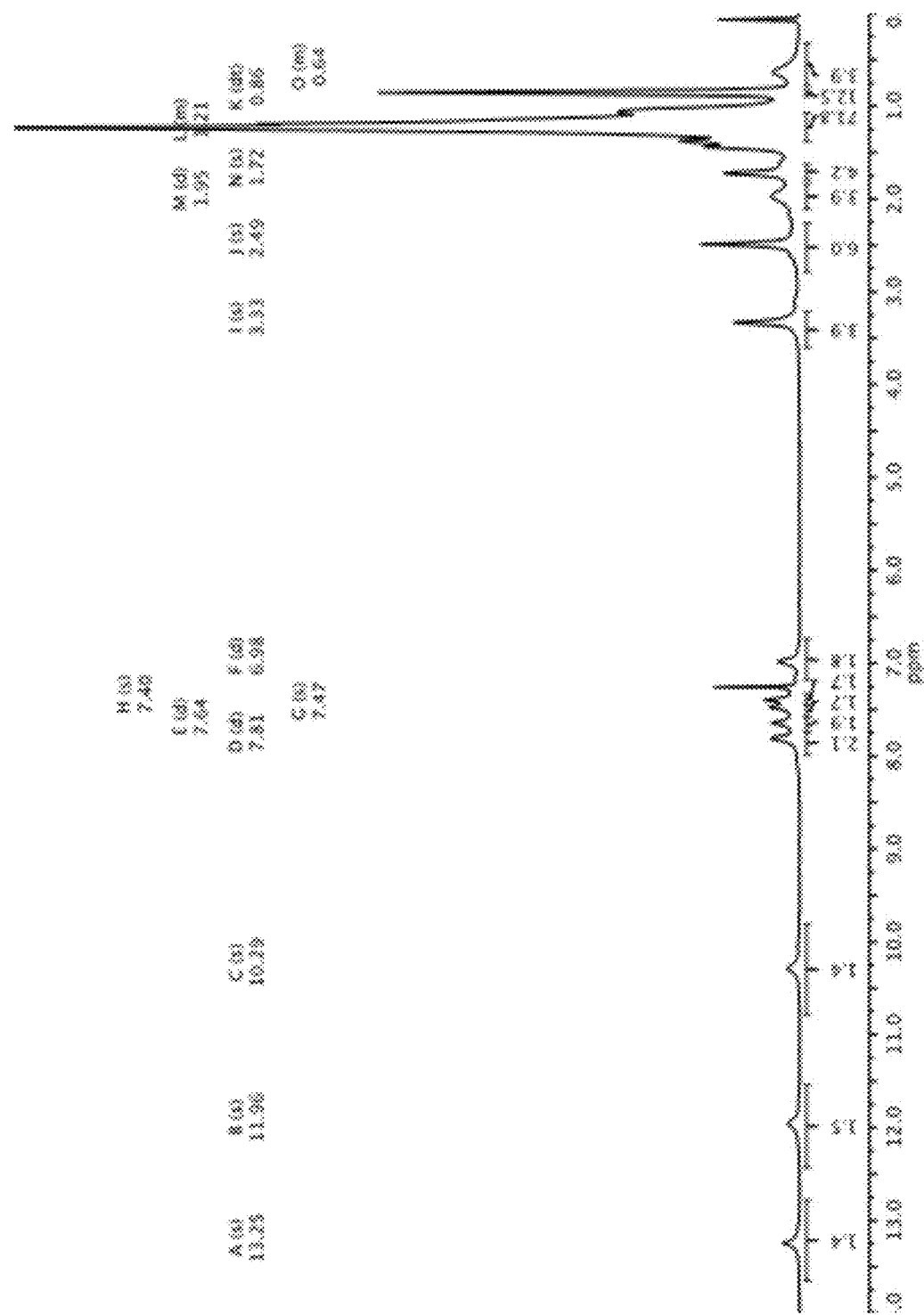
FIGS. 6A-6B illustrate examples of spectra of a supramolecular polymer, in accordance with various embodiments.
Figure 6B:
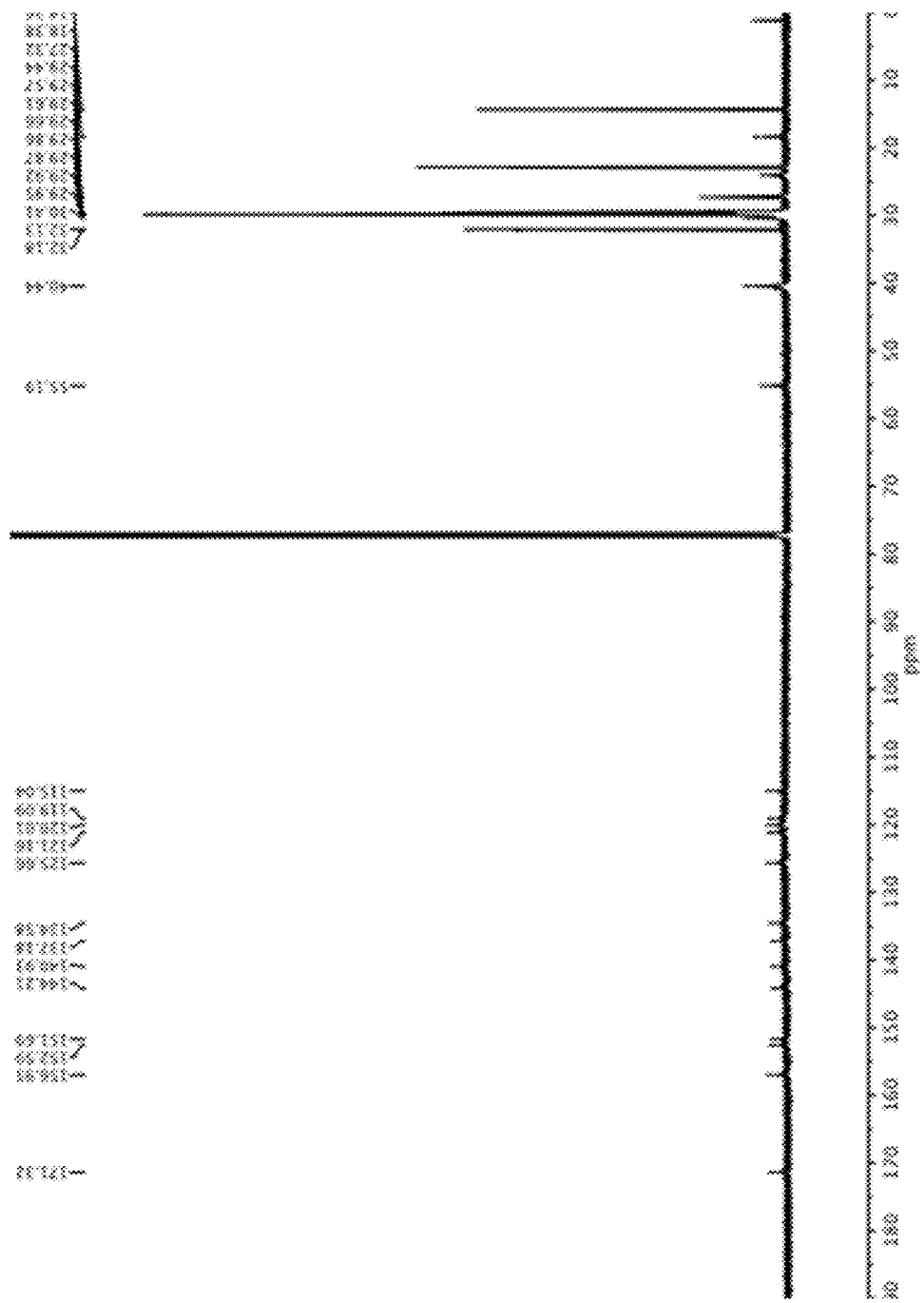

For example, the UPy compound (1.7 g, 4.7 mmol) and fluorene (1.6 g, 2.1 mmol) are suspended in a mixture of DMF (100 milliliter (mL)) and TEA (30 mL) under N2 atmosphere. The mixture is degassed and [Pd(AOc)2] (48 mg, 0.21 mmol) and tri(o-tolyl)phosphine (130 mg, 0.42 mmol) is added. The mixture is stirred at 95° C. for 16 hours, and then filtered hot over glass wool. The bright orange solution is concentrated in vacuum. The remaining solid is dissolved in CHCl3 (70 mL)/TFA (1 mL) and precipitated with MeOH (120 mL). The precipitate is filtered off and washed with MeOH. In various specific experimental embodiments, this re-precipitation procedure is repeated to afford compound 450 (1.9 g, 74%) as a yellow solid. The supramolecular polymer (compound 450 as illustrated by FIG. 4) dissolves slowly in chloroform and is sparingly soluble in toluene, but rapidly dissolves upon addition of small quantities of trifluoroacetic acid (TFA) in both solvents. The following include example mass spectrometer results: 1H NMR (600 MHz, CDCl3): δ=0.53-0.74 (m, 4H), 0.86 (dt, J=13.1, 7.0, 12H), 0.96-1.54 (m, 72H), 1.72 (s, 4H), 1.95 (d, J=31.6, 4H), 2.49 (s, 6H), 3.33 (s, 4H), 6.98 (d, J=16.4, 2H), 7.40 (s, 2H), 7.47 (s, 2H), 7.64 (d, J=8.3, 2H), 7.81 (d, J=14.9, 2H), 10.29 (s, 2H), 11.96 (s, 2H), 13.25 (s, 2H). 13C NMR (151 MHz, CDCl3): δ=14.36, 18.38, 24.07, 27.32, 29.44, 29.57, 29.61, 29.66, 29.86, 29.87, 29.92, 29.95, 30.41, 32.13, 32.18, 40.44, 55.19, 115.04, 119.09, 120.01, 121.16, 125.66, 134.58, 137.18, 140.93, 144.21, 151.69, 152.59, 156.95, 171.32 as illustrated by FIGS. 6A and 6B. FIGS. 6A-6B illustrate examples of spectra of a supramolecular polymer, in accordance with various embodiments. For example, FIG. 6A illustrates Hydrogen (H)NMR of the supramolecular polymer in CDCl$_3$ at 298 K. FIG. 6B illustrates Carbon (C)NMR of the supramolecular polymer in CDCl$_3$ at 298 K.

Figure 7A:
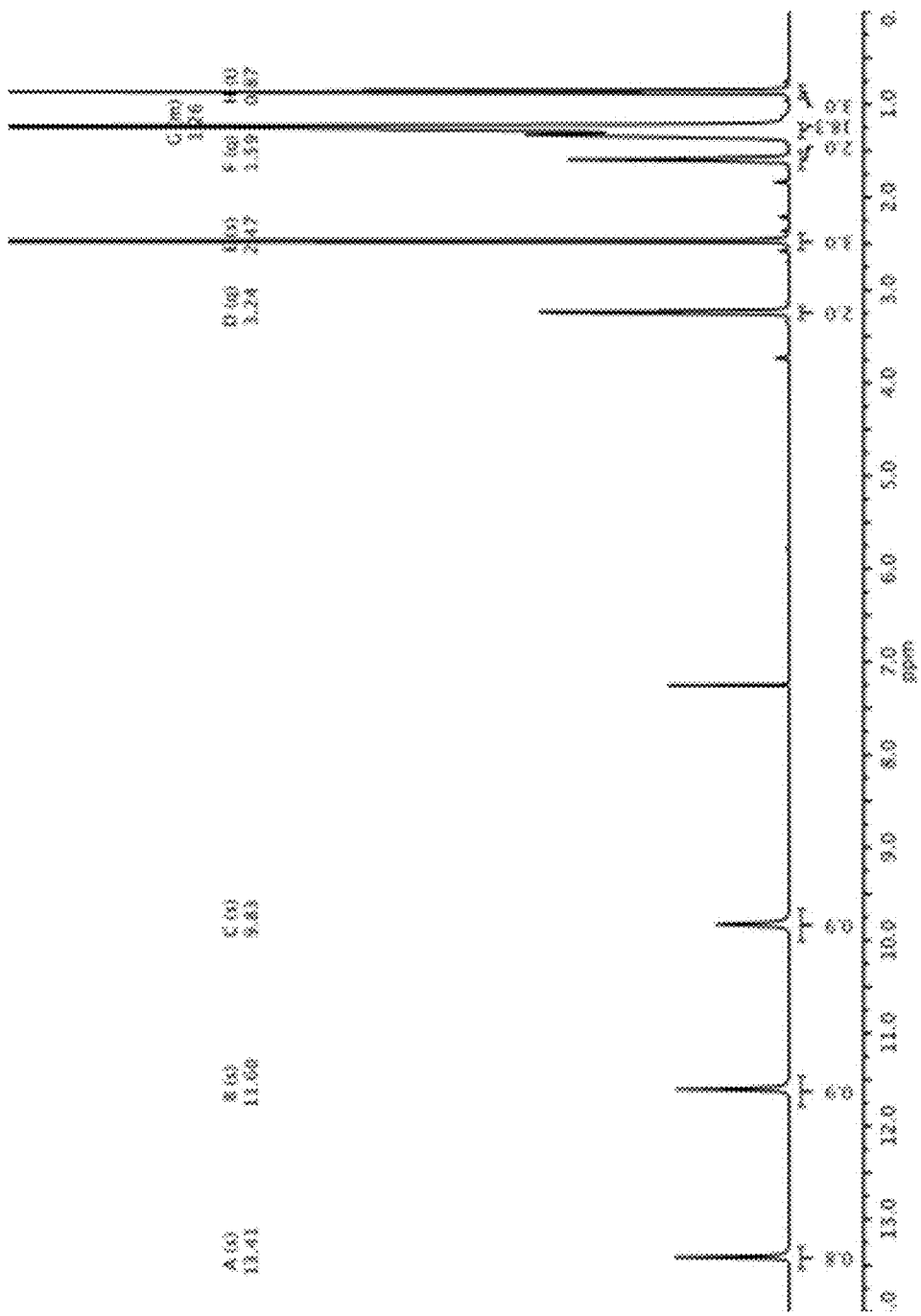
FIGS. 7A-7B illustrate examples of spectra of a compound used to form the supramolecular polymer, in accordance with various embodiments.
Figure 7B:
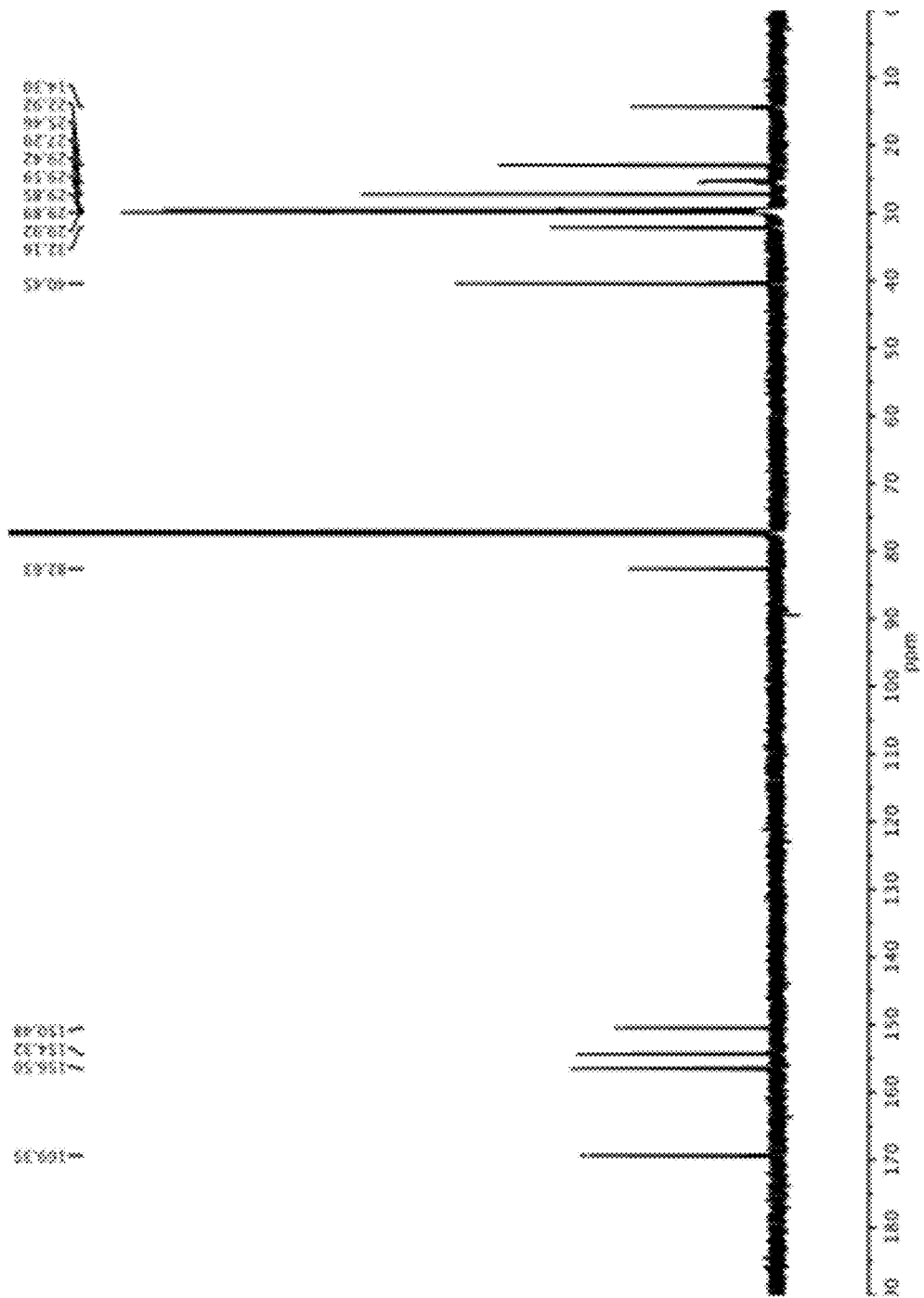

Iodo-UPy, which is characterized by 1-Dodecyl-3-(5-iodo-6-methyl-4-oxo-1,4-dihydropyrimidin-2-yl)urea, is synthesized in various embodiments by suspending the compound 2-Amino-5-iodo-6-methylpyrimidin-4(3H)-one (12.4 g, 49.4 mmol in dry THF) (500 mL). Dodecyl isocyanate (20.2 mL, 84.0 mmol) is added, and the mixture is stirred at 90° C. for 8 days. The mixture is cooled to 25° C., the formed precipitate is filtered off, and washed with CH2Cl2 to afford Iodo-UPy as a white solid (22.0 g, 96%). The following include example mass spectrometer results: 1H NMR (600 MHz, CDCl3): δ=0.87 (t, J=7.0, 3H), 1.17-1.40 (m, 18H), 1.59 (q, J=7.2, 2H), 2.47 (s, 3H), 3.24 (q, J=6.6, 2H), 9.83 (s, 1H), 11.60 (s, 1H), 13.41 (s, 1H). 13C NMR (151 MHz, CDCl3): δ=14.30, 22.92, 25.46, 27.20, 29.42, 29.59, 29.85, 29.89, 29.92, 32.16, 40.45, 82.63, 150.48, 154.32, 156.50, 169.35. HR-ESI-MS: m/z (%): 485.1361 (100, [M+Na]+, calculated for C18H30IN4O2Na+: 485.1378) as illustrated by FIGS. 7A and 7B. FIGS. 7A-7B illustrate examples of spectra of a compound used to form the supramolecular polymer, in accordance with various embodiments. For example, FIG. 7A illustrates an H NMR of the iodo-UPy in CDCl$_3$ at 298 K. FIG. 7B illustrates a C NMR of the iodo-UPy in CDCl$_3$ at 298 K.

Figure 8A:
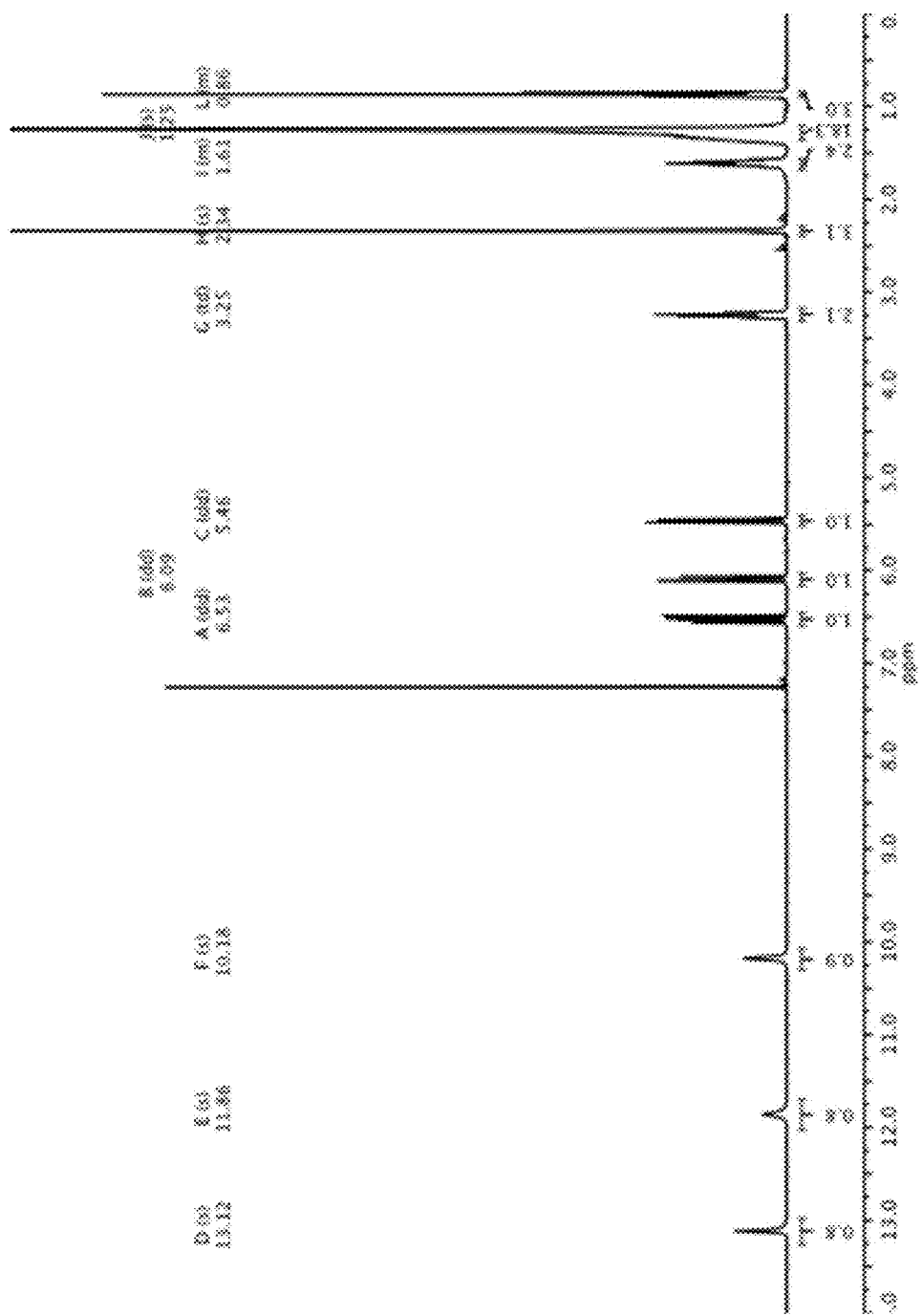
FIGS. 8A-8B illustrate examples of spectra of a compound used to form the supramolecular polymer, in accordance with various embodiments.
Figure 8B:
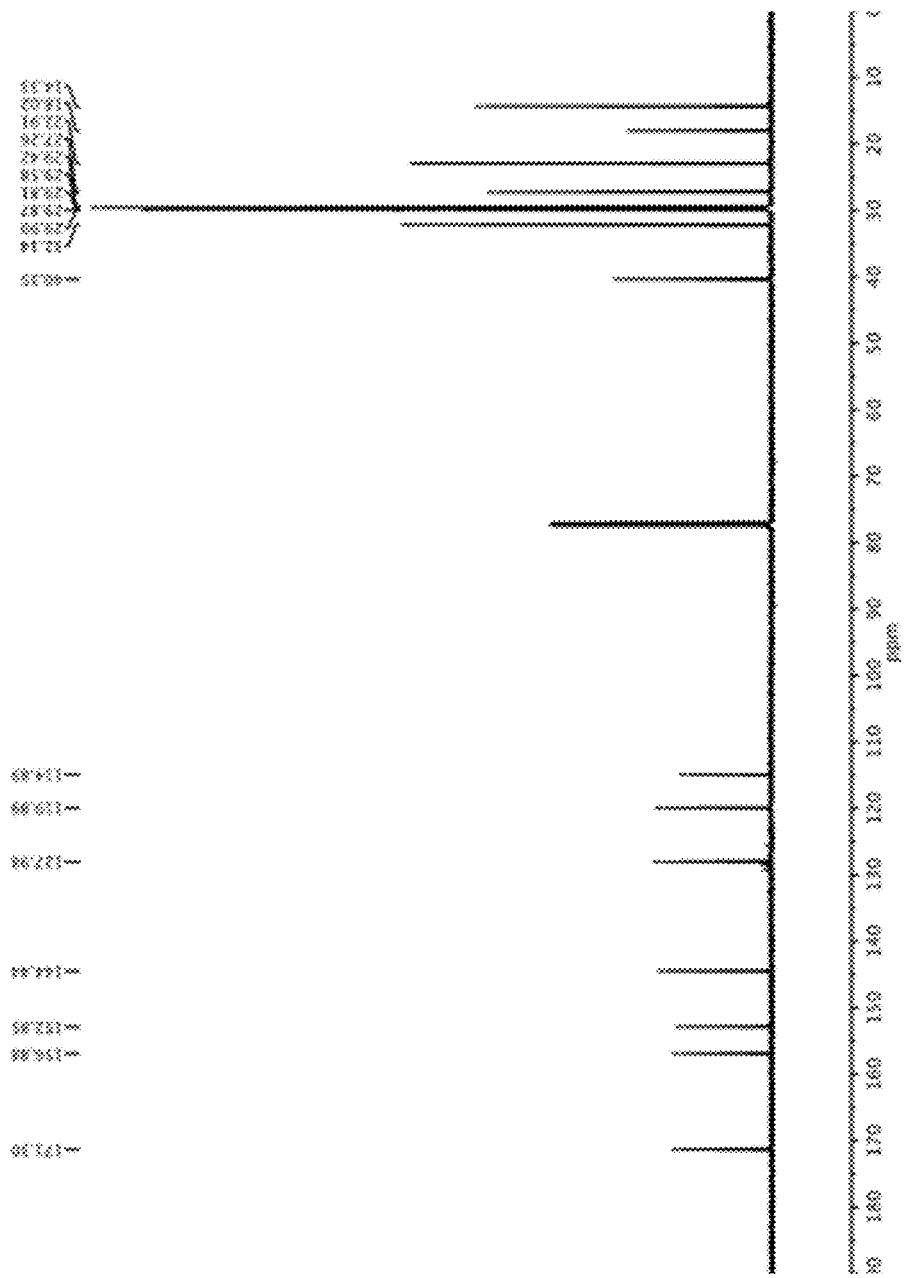

Vinyl UPy (compound 446 illustrated by FIG. 4), which is characterized 1-Dodecyl-3-(6-methyl-4-oxo-5-vinyl-1,4-dihydropyrimidin-2-yl)urea is synthesized in various embodiments by dissolving the iodo-UPy (4.0 g, 8.7 mmol), [Pd(PPh3)2Cl2] (304 mg, 433 mmol), and 2,6-di-t-butyl-phenol (37 mg, 0.17 mmol) in toluene (60 mL). Tributyl(vinyl)stannane (3.0 mL, 10 mmol) is added and the mixture is degassed and heated to 100° C. for 16 hours. The mixture is filtered hot over a plug of cotton followed by hot filtration over Celite. The obtained yellow-orange solution is cooled to 25° C., resulting in crystal formation. The formed crystals are filtered off, washed with small quantities of toluene, and dried, to afford vinyl UPy, as a white solid (2.49 g, 79%). The following include example mass spectrometer results: 1H NMR (400 MHz, CDCl3): δ=0.85-0.91 (m, 3H), 1.25 (s, 18H), 1.53-1.73 (m, 2H), 2.34 (s, 3H), 3.25 (td, J=7.2, 5.3, 2H), 5.46 (dd, J=11.7, 2.2, 1H), 6.09 (dd, J=17.6, 2.2, 1H), 6.53 (dd, J=17.6, 11.7, 1H), 10.18 (s, 1H), 11.86 (s, 1H), 13.12 (s, 1H). 13C NMR (151 MHz, CDCl3): δ=14.33, 18.02, 22.91, 27.26, 29.42, 29.58, 29.81, 29.87, 29.90, 32.14, 40.35, 114.89, 119.89, 127.98, 144.44, 152.85, 156.88, 171.30. HR-ESI-MS: m/z (%): 363.2748 (100, [M+H]+, calculated for C20H35N4O2+: 363.2755), as illustrated by FIGS. 8A-8B. FIGS. 8A-8B illustrate examples of spectra of a compound used to form the supramolecular polymer, in accordance with various embodiments. For example, FIG. 8A illustrates an H NMR of the vinyl UPy in CDCl$_3$ at 298 K. FIG. 8B illustrates a C NMR of the vinyl UPy in CDCl$_3$ at 298K.

Figure 9A:
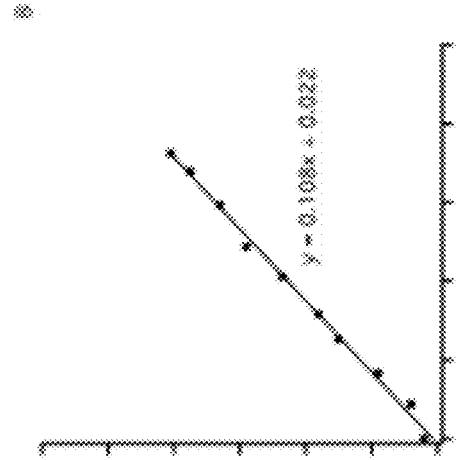
FIGS. 9A-9C illustrate examples of a correlation between the diffusion coefficient and the molecular weight of a formed supramolecular polymer, in accordance with various embodiments.
Figure 9B:
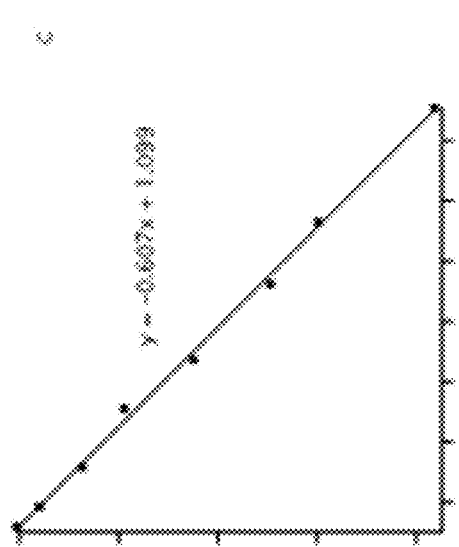
Figure 9C:
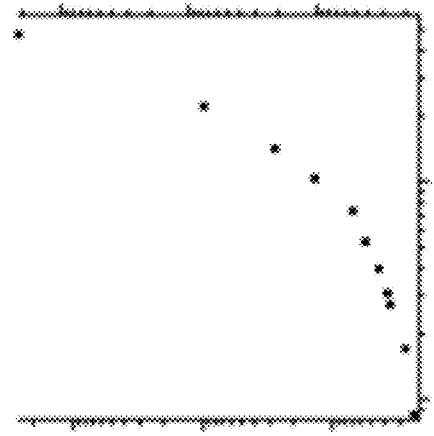

FIGS. 9A-9C illustrate examples of a correlation between the diffusion coefficient and the molecular weight of a formed supramolecular polymer, in accordance with various embodiments. In various embodiments, there is a correlation between the DOSY diffusion coefficient and the molecular weight of the supramolecular polymer. For example, in a titration experimental embodiment, the supramolecular polymer with monofunctional chain stopper (e.g., the vinyl UPy 446 moieties) has a correlation of the relative diffusion coefficient of the supramolecular polymer to its molecular weight (FIG. 9A). For example, FIG. 9A illustrates the relative diffusion coefficient of the supramolecular polymer as a function of the added molar fraction x of the monofuctional chain stopper (e.g., the vinyl UPy). Accordingly, in various embodiments, this correlation is utilized by indicating at sufficiently high molar fractions x of the chain stopper (e.g., the vinyl UPy moieties), the degree of polymerization N is described by the relation:

$$N=2/x$$

On the other hand, the average molecular weight M as a function of N is $$M=(N-1)\times M(1)+2\times M(2)$$

as a given N represents a linear chain of N−1 monomers 1 end-capped by two monofunctional chains stoppers. Assuming an exponential relation between D and M:

$$D=p\times M^q$$

plotting $$\log D=\log p+q\log M,$$

in various embodiments, yields a straight line with slope q and y-intercept log p. FIG. 9B illustrates an example of such a plot together with the extracted parameters log p and q, which are utilized to calculate M and N of polymer 1 as a function of its concentration. FIG. 9C illustrates the molecular weight M and degree of polymerization N as a function of the concentration.

In various experimental and/or more specific embodiments, dispersion parameters are varied. For example, the influence of various dispersion parameters, including polymer 1/SWNT ratio, SWNT concentration, sonication power, and sonication time on the yield and purity of the obtained SWNT dispersions are investigated. The SWNT dispersion yield is defined as the mass percentage of dispersed SWNTs relative to the mass of SWNTs present in the employed SWNT sample. Besides actual SWNTs, a SWNT sample generally contains metal catalyst-, amorphous carbon-, and graphitic impurities. Therefore, knowledge of the SWNTs content in the employed SWNT mixture (P2-SWNTs) is used to obtain SWNT dispersion yields. Because the supramolecular polymer, in various embodiments, is surprisingly able to selectively disperse SWNTs of a particular electrical type and is removed from the dispersed SWNTs, the SWNT dispersion yield is directly quantified by measuring the mass of released SWNTs. The dispersion yield, in various embodiments, yields a relatively large amount of dispersed SWNTs, in order to reduce the weighing error for a particular dispersion condition. The obtained yield is then used together with absorption spectroscopy data to calculate SWNT dispersion yields for other dispersion conditions. This procedure is further described herein. While absolute quantification of the S/M-SWNT ratio via absorption spectroscopy is not possible, the ϕ value is used as a relative measure for the S-SWNT purity.

In various experimental embodiments, dispersion experiments are performed in toluene using an Ultrasonicator, such as a Cole Parmer—CP 750 Ultrasonicator with a 0.7 cm sonication tip. For example, the polymer and SWNTs are combined in a test tube, 20 mL toluene is added, and the mixture is sonicated for a given time at a given sonication power. The test tube is cooled using an external circulator, with a bath temperature set to 22 Celsius (° C.). The sonicated samples are then centrifuged for 30 minutes at 17000 rpm and 16° C., the supernatants are removed with a syringe, and analyzed by absorption spectroscopy.

FIGS. 10A-10C illustrate examples of SWNT mixture and resulting dispersed SWNTs isolated using a supramolecular polymer, in accordance with various embodiments. In a number of specific embodiments, the content of SWNTs in the employed SWNT mixture (e.g., sample) is determined using TGA analysis or absorption spectroscopy. For laser-vaporization and plasma-derived SWNTs, this content is determined to be 33% and 53%, respectively, in various experimental embodiments. For the P2-SWNTs, according to near-IR analysis (FIG. 10A) the SWNT fraction in the mixture is around 70%, while graphitic nanoparticles correspond to the remaining 30% of the total nanocarbon content. FIG. 10A illustrates the Near-IR of P2-SWNTs and FIG. 10B illustrates TGA analysis of P2-SWNTs. According to TGA analysis, the residual catalyst impurities contribute to 7% of the overall SWNT mixture mass (FIG. 10B). From this data, the SWNT content in the SWNT mixture is calculated to be 65%.

The absorbance coefficient and yield of dispersed SWNTs, in accordance with a number of experimental embodiments, are determined. For example, the supramolecular polymer (26.6 mg) and AD-SWNTs (26.0 mg) are sonicated in 20 mL toluene for 30 minutes at 70% power, while externally cooled with a temperature bath set to 22° C. The mixture is centrifuged for 30 minutes at 17000 and 16° C. Absorption spectroscopy reveals a peak absorption of A=0.312 at λ=1016 nm for a d=0.1 cm cuvette. 15 mL of this solution is treated with 0.15 mL TFA, resulting in SWNT precipitation. The SWNTs are filtered over a 0.2 microliters (uL) PTFE membrane (whose mass is pre-determined with a microbalance), washed with 20 mL TFA solution (1% in toluene), then with 10 mL toluene, and dried. Weighing the PTFE membrane with the SWNTs yielded a SWNT mass of 0.90 mg, which corresponds to 1.20 mg in the original 20 mL dispersion. This corresponds to an extinction coefficient of ε=52 mL mg-1 cm-1 according to Lambert-Beer law (A=εcd), which is close to the value of ε=48.3 mL mg-1 cm-1 determined using an indirect approach. Assuming an SWNT content of 65% in the original SWNT mixture, the SWNT dispersion yield of that mixture amounts to 7.1% (FIG. 10C). FIG. 10C illustrates the absorption spectrum for SWNT dispersion (e.g., the isolated S-SWNTs) obtained from sonicating the supramolecular polymer and AD-SWNTs (26.0 mg) in 20 mL toluene for 30 minutes at 70% power. With such information, the SWNT dispersion yields obtained with other dispersion conditions are calculated from the respective absorption maxima at λ=1016 nm.

Figure 11B:
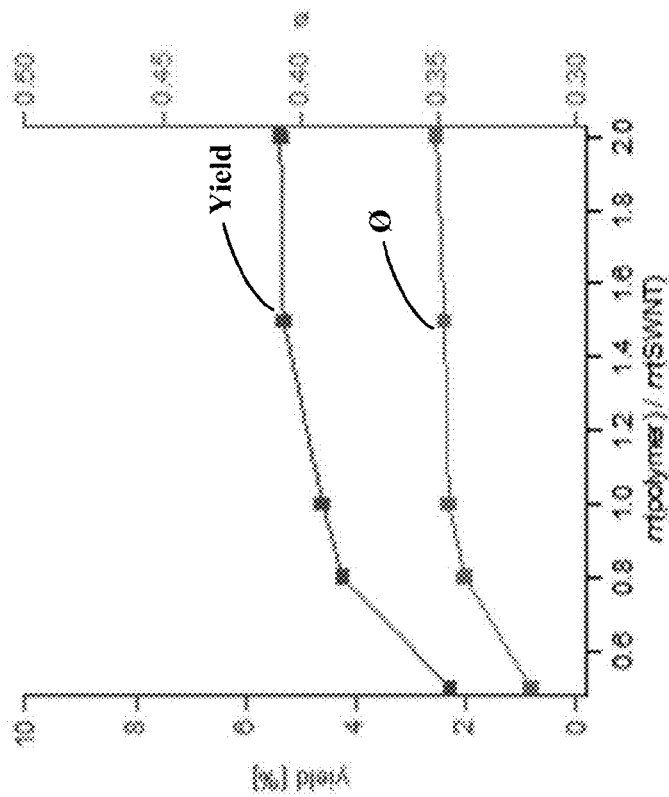
FIGS. 11A-11B illustrate examples of the results of adjusting the dispersion parameter of the supramolecular polymer to SWNT mixture ratio, in accordance with various embodiments.
Figure 11A:
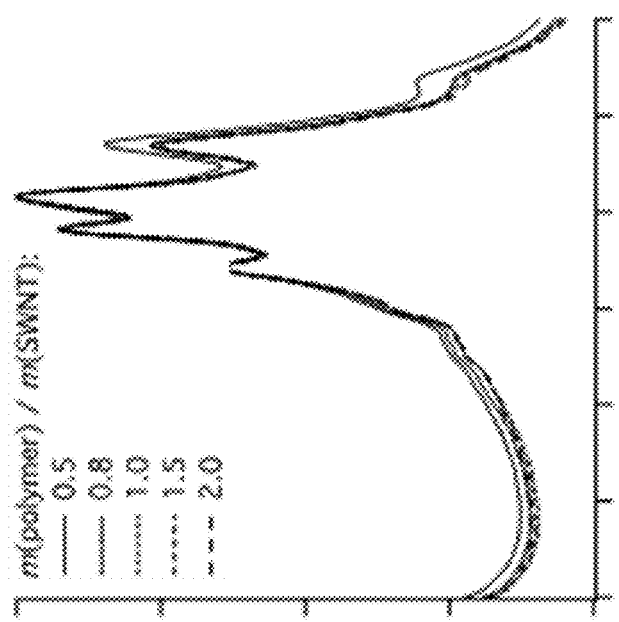

In various embodiments, the influence of dispersion parameters on SWNT dispersion yield and purity is identified. For example, in accordance with some instances, both SWNT dispersion yield and S-SWNT purity increase with increasing polymer/SWNT ratio, but then level out at a ratio of approximately 1.5. FIGS. 11A-11B illustrate examples of adjusting dispersion parameter of the supramolecular polymer to SWNT mixture ratio, in accordance with various embodiments. FIG. 11A illustrates the absorption spectra of the SWNT dispersion, such as the isolated S-SWNTs, using various polymer to SWNT mixture ratios with the value of the polymer being 5 milligrams (and sonicated for 30 minutes at 40% power). The spectra, for example, are normalized for a maximum of 1016 nm. FIG. 11B illustrates a plot showing SWNT dispersion yields and φ values extracted from the absorption spectra illustrated by FIG. 11A.

On the other hand, while the SWNT dispersion yield decreases with increasing input SWNT concentration w(SWNT), the S-SWNT purity slightly increases. FIGS. 12A-12B illustrate examples of adjusting the dispersion parameter of the SWNT concentration, in accordance with various embodiments. For example, FIG. 12A illustrates the absorption spectra of the SWNT dispersion, such as the isolated S-SWNTs, using various SWNT concentrations with a ratio of the polymer to SWNT mixture of 1 (and sonicated for 30 minutes at 70% power). The spectra, for example, are normalized for a maximum of 1016 nm. FIG. 12B illustrates a plot showing SWNT dispersion yields and φ values extracted from the absorption spectra illustrated by FIG. 12A.

Further, lower sonication powers or sonication times lead to lower SWNT yields but significantly higher S-SWNT purities. FIGS. 13A-13B illustrate examples of adjusting the dispersion parameter of the sonication power, in accordance with various embodiments. For example, FIG. 13A illustrates the absorption spectra of the SWNT dispersion, such as the isolated S-SWNTs, using various sonication powers with a polymer weight of 5 mg and with a polymer to SWNT mixture ratio of 1 (and sonicated for 30 minutes). The spectra, for example, are normalized for a maximum of 1016 nm. FIG. 13B illustrates a plot showing SWNT dispersion yields and φ values extracted from the absorption spectra illustrated by FIG. 13A.

Figure 14B:
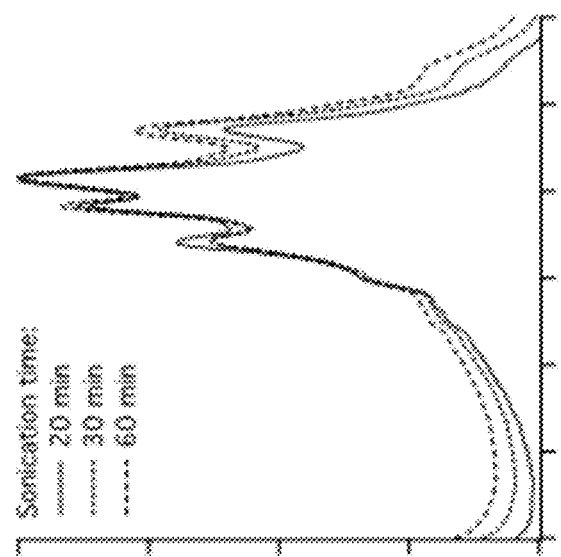
FIGS. 14A-14B illustrate examples of adjusting the dispersion parameter of the sonication time, in accordance with various embodiments.
Figure 14A:
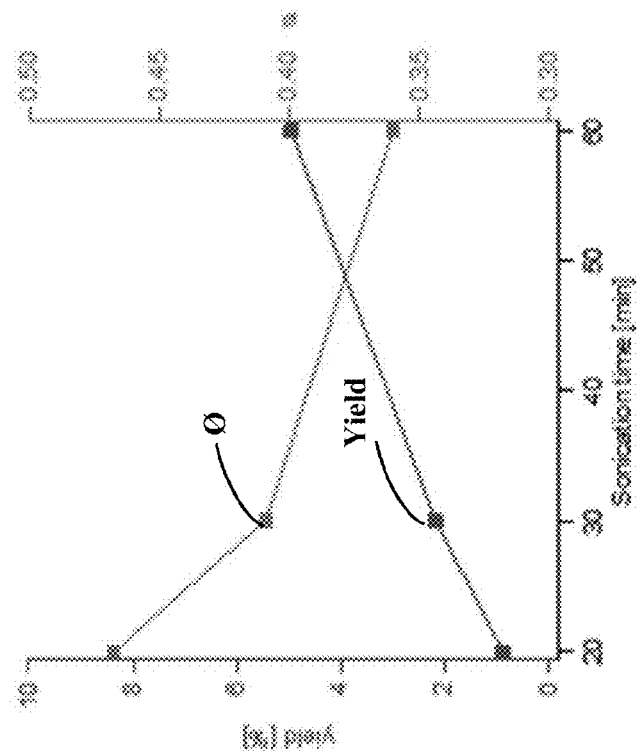

FIGS. 14A-14B illustrate examples of adjusting the dispersion parameter of the sonication time, in accordance with various embodiments. For example, FIG. 14A illustrates the absorption spectra of the SWNT dispersion, such as the isolated S-SWNTs, using various sonication times with a polymer weight of 5 mg and a polymer to SWNT mixture ratio of 1 (and sonicated power of 30%). The spectra, for example, are normalized for a maximum of 1016 nm. FIG. 14B illustrates a plot showing SWNT dispersion yields and φ values extracted from the absorption spectra illustrated by FIG. 14A.

The ability of supramolecular polymer to disperse SWNTs, in a number of experimental embodiments, is compared with the corresponding conventional polymer poly(9,9-di-n-dodecylfluorene) (PFDD) and monofunctional UPy compound (e.g., vinyl UPy) under the same dispersion conditions (5 mg dispersing agent, 5 mg AD-SWNTs, 30 minutes sonication at 70% power). Example supramolecular polymers (e.g., polymer 1) exhibit about 7 times higher dispersion yield and higher purity φ=0.31 for polymer 1 vs. φ=0.27 for PDDD). Further, vinyl Upy showed no (or minimal) ability to disperse SWNTs. FIG. 15 illustrates an example of an absorption spectra of isolated SWNTs of a particular electrical type, in accordance with various embodiments, that is obtained using the supramolecular polymer and poly(9,9-di-n-dodecylfluorene) (PFDD), and vinyl UPy as dispersing agents under the same dispersion conditions (of 5 mg dispersing agent, 5 mg AD-SWNTs, 30 minutes sonication time at 70% power).

Further comparisons include comparing a polymer/SWNT sample obtained under dispersion parameters optimized for a high purity (5 mg polymer 1, 5 mg AD-SWNTs, 20 minutes sonication at 30% power) with a commercial polymer/SWNT sample. This comparison is directed at the maximum achievable SWNT purity. FIG. 16 illustrates an example of an absorption spectra of isolated SWNTs of a particular electrical type and isolated under particular dispersion parameters, in accordance with various embodiments. As illustrated by FIG. 16, the absorption spectra of the supramolecular polymer/SWNT mixture under the above-described dispersion parameters is compared to a commercial polymer/SWNT mixture.

In a number of experimental embodiments, Raman spectra are recorded on a confocal Raman system (LabRam Aramis from Horiba Jobin Yvon) at 532 nm, 638 nm, and 785 nm excitation at 100× magnification. The sorted SWNT sample is prepared by drop-casting a polymer 1/SWNT solution (sorted SWNTs) on a Si substrate. The pristine SWNT sample is prepared by drop casting a SWNT dispersion in NMP. The dispersion is obtained by sonicating 1.7 mg AD-SWNTs in 20 mL NMP for 30 minutes at 70% sonication power, followed by centrifugation at 16000 rpm for 30 minutes. Data is processed by averaging nince spectra measured at different locations. FIGS. 17A-17D illustrate examples of spectra of pristine and sorted SWNTs at various excitation waves, in accordance with various embodiments. Characteristic regions of the Raman spectra are showed in FIGS. 17A-D.

In various embodiments, the photoluminescence is compared to the Excitation (PLE) Mapping. PLE spectra are measured on a NIR spectroscopy setup in the region of 1150-2100 nm. The excitation source is a 150 W ozone-free Xenon lamp (Oriel), which is dispersed by a monochromator (Oriel) to generate excitation lines with a bandwidth of 15 nm. The excitation light in the range of 700-1050 nm is focused on the sample, and filtered by a 1100-nm short-pass filter (Thorlabs). The emission is collected in the 1150-2100 nm emission range using a 1100-nm long-pass filter. The emission is collected into a spectrometer (Acton SP2300i) equipped with a liquid-nitrogen-cooled InGaAs 1 dimension detector (Princeton OMA-V). PLE are plotted post-collection to account for the sensitivity of the detector, extinction feature of the filter and the power of the excitation using the MATLAB.

Figure 18:
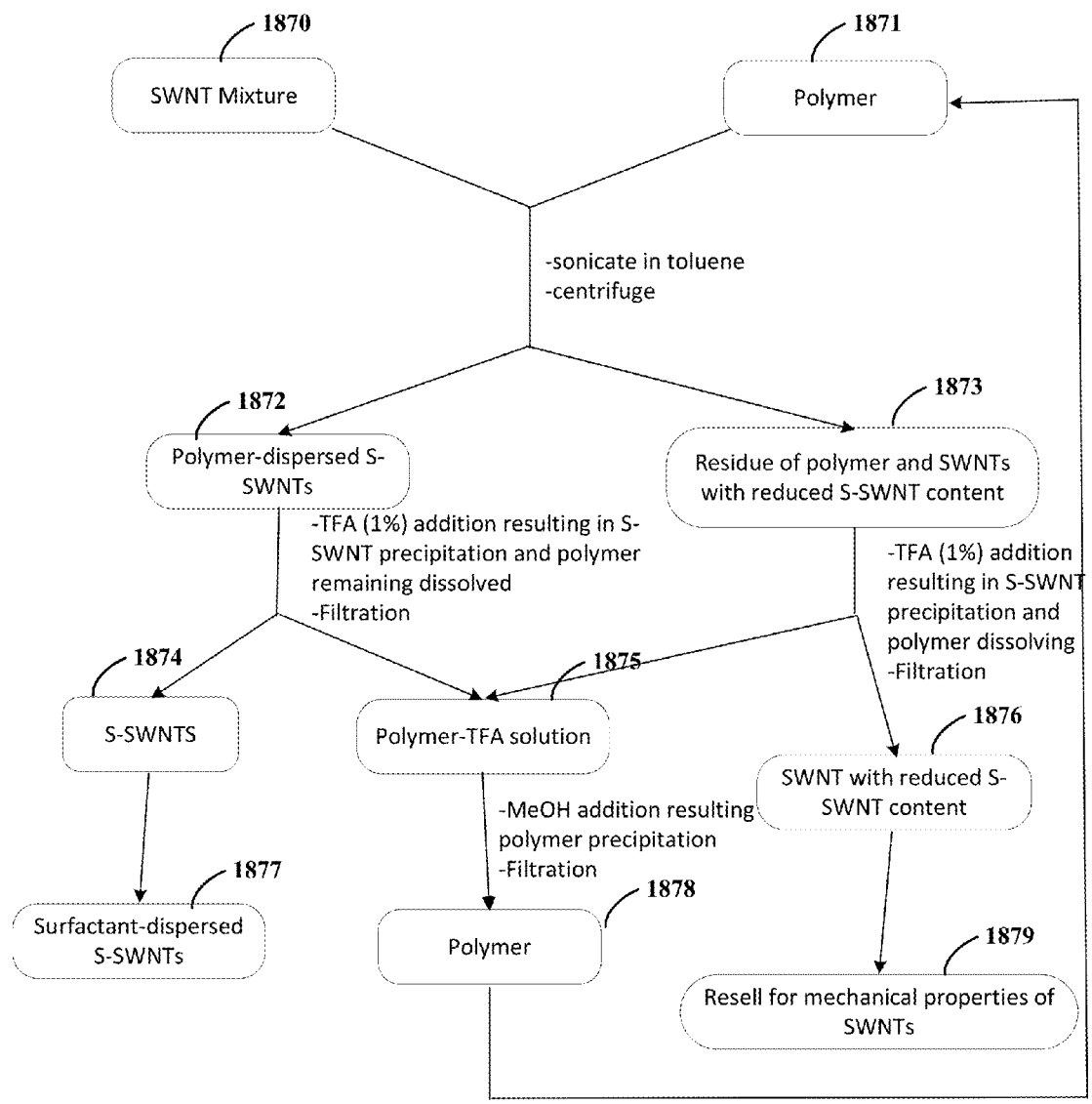
FIG. 18 illustrates example uses of SWNTS and/or supramolecular polymer, in accordance with various embodiments.

FIG. 18 illustrates examples of uses of SWNTS and/or supramolecular polymer, in accordance with various embodiments. For example, in various embodiments, the supramolecular polymer is used to sort SWNTs from a SWNT mixture that results in three or more different SWNT end-products and re-assembled supramolecular polymer 1878. The SWNT end-products include polymer-dispersed S-SWNTs 1872, S-SWNTs 1874, surfactant-dispersed S-SWNTs 1877, and SWNTs with reduced S-SWNT content 1876, in various embodiments. Although FIG. 18 illustrates selective dispersion of S-SWNTs, embodiments are not so limited and include selective dispersion of M-SWNTs.

As previously described in connection with FIG. 2, the supramolecular polymer 1871 is added to a SWNT mixture 1870. A solvent, such as toluene, is added and the combined mixture is sonicated and centrifuged. The result of which is polymer-dispersed S-SWNTs 1872 and a residue 1873 including precipitated supramolecular polymer and SWNTs with reduced S-SWNT content (e.g., M-SWNTs and reduced S-SWNTs). The polymer-dispersed S-SWNTs 1872, in various embodiments, is the dispersed complex, as previously discussed.

In a number of embodiments, dispersion parameters are adjusted to select the resulting S-SWNTs that are isolated, such as a purity and yield of the SWNTs. Example dispersion parameters for the sonication includes a ratio of supramolecular polymer to SWNT mixture, concentration of the SWNTs, sonication power and sonication time. Example dispersion parameters for the centrifugation include speed, temperature, and time.

As previously discussed, in various embodiments, a portion (e.g., a majority) of the supramolecular polymer remains precipitated with the SWNTs with the non-dispersed SWNTs of the first electrical type (e.g., SWNTs with reduced S-SWNT content). The portion of the supramolecular polymer from the residue 1873 is isolated by adding a solvent with a bond disrupting agent, such as TFA, causing the supramolecular polymer to dissolve in solution (e.g., the polymer-TFA solution 1875) and non-dispersed SWNTs remain precipitated. The non-dispersed SWNTs are filtered from the residue 1873 to produce SWNTs with reduced S-SWNT content 1876. The SWNTs with reduced SWNT-content 1876, in various embodiments, are sold for mechanical property applications 1879. The supramolecular polymer in the polymer-TFA solution 1875 is precipitated and isolated by adding an antisolvent, such as methanol, to the polymer-TFA solution 1875 and filtering to isolate the supramolecular polymer 1878. As illustrated, the isolated polymer 1878, in various embodiments, is recycled and re-used as the polymer 1871 to selectively isolate S-SWNTs. That is, the isolated supramolecular polymer 1878 and the polymer 1871, in various embodiments, are structurally the same and/or have the same chemical properties.

Further, S-SWNTs 1874 are isolated from the polymer-dispersed S-SWNTs 1872 by adding a solvent, such as 1% TFA, to precipitate the S-SWNTs while the supramolecular polymer remains dissolved. The precipitated S-SWNTs are then isolated via filtration. In various embodiments, the isolated S-SWNTs 1874 are dispersed in a surfactant to form surfactant-dispersed S-SWNTs 1877. A surfactant, as used herein, is a compound that lowers a surface tension between two liquids or between a liquid and solid. In various embodiments, the surfactant is amphiphilic (e.g., contains hydrophilic and hydrophobic groups).

Similar to the above described precipitation and isolation of the supramolecular polymer from the residue 1873, the addition of the solvent and filtration of the S-SWNTs results in a polymer-TFA solution 1875. The polymer is precipitated by adding an antisolvent, such as methanol, to the polymer-TFA solution 1875 and the precipitated polymer is filtered to isolate the supramolecular polymer 1878. The isolated polymer 1878, in various embodiments, is recycled and re-used as the polymer 1871 to selectively isolate S-SWNTs.

Various embodiments are implemented in accordance with the underlying Provisional Application Ser. No. 62/137,599, entitled "Isolating Semiconducting Single-Walled Nanotubes or Metallic Single-Walled Nanotubes and Approaches Therefor", filed Mar. 24, 2015, and with three Appendices, to which benefit is claimed and which are fully incorporated herein by reference. For instance, embodiments herein and/or in the provisional application (including the appendices therein) may be combined in varying degrees (including wholly). Reference may also be made to the experimental teachings and underlying references provided in the underlying provisional application, including the Appendices that form part of the provisional application. Embodiments discussed in the Appendices are not intended, in any way, to be limiting to the overall technical disclosure, or to any part of the claimed invention unless specifically noted.

The Appendices of the underlying Provisional Application are hereby fully incorporated by reference for their general and specific teachings. Appendix A entitled "H-bonded Supramolecular Polymer for the Selective Dispersion and Subsequent Release of Large Diameter Semiconducting Single-Walled Carbon Nanotubes", Appendix B entitled "Nanotube Sorting with A Supramolecular Polymer", and Appendix C entitled "Supporting Information", generally and specifically describes compounds, methods of use, and method of synthesize, including preparations of a supramolecular polymer and isolations of SWNTs as illustrated herein. These documents are fully incorporated herein by reference for their teachings (including background references cited therein and which disclose applications beneficial to aspects of the present disclosure), generally and specifically, to the structures, processes, chemicals and uses described and shown therein.

Based upon the above discussion and illustrations, those skilled in the art will readily recognize that various modifications and changes may be made to the present disclosure without strictly following the exemplary embodiments and applications illustrated and described herein. For example, the supramolecular polymer as shown and discussed may be replaced with polymers of different arrangements (e.g., involving different carbon side-chains and/or different moieties in the back-bone). Such modifications do not depart from the true spirit and scope of the present disclosure, including that set forth in the following claims.

What is claimed is:

1. A method comprising:
    using a supramolecular polymer to selectively disperse single-walled carbon nanotubes (SWNTs) of a first electrical type from a single-walled carbon nanotube (SWNT) mixture including SWNTs of at least two electrical types and not disperse SWNTs of a second electrical type from the SWNT mixture, thereby isolating the SWNTs of the first electrical type and providing a solution including a disassembled supramolecular polymer and a bond disrupting agent with the SWNTS of the first electrical type and second electrical type removed;
    adding an antisolvent to the solution to precipitate the supramolecular polymer from the disassembled supramolecular polymer; and
    isolating the precipitated supramolecular polymer from the bond disrupting agent.

2. The method of claim 1, wherein the supramolecular polymer is soluble in non-polar solvents and the method further includes:
    providing a dispersed complex including the supramolecular polymer and SWNTs of a particular electrical type, wherein the particular electrical type includes one of the first electrical type and the second electrical type; and
    adding the bond disrupting agent to the dispersed complex to form the disassembled supramolecular polymer and isolating the SWNTs.

3. The method of claim 2, wherein isolating the SWNTs includes filtering the SWNTs of the particular type from the solution without selectively precipitating the SWNTs of the particular type.

4. The method of claim 1, wherein providing the solution includes isolating SWNTs from the SWNT mixture by:
    adding the supramolecular polymer and a nonpolar solvent to the SWNT mixture to form a mixture of non-dispersed SWNTs of the first electrical type and the supramolecular polymer, and a dispersed complex including dispersed SWNTs of the second electrical type and the supramolecular polymer to selectively disperse the SWNTs of the second electrical type,
    removing the non-dispersed SWNTs of the first electrical type; and
    disassembling the supramolecular polymer to form the disassembled supramolecular polymer and to release the SWNTs of the second electrical type using the bond disrupting agent.

5. The method of claim 4, wherein adding the supramolecular polymer to the SWNT mixture includes combining the supramolecular polymer and the SWNT mixture in a solvent and sonicating the combined mixture.

6. The method of claim 4, wherein adding the supramolecular polymer to the SWNT mixture includes combining the supramolecular polymer and the SWNT mixture in toluene or chloroform and adding the bond disrupting agent includes adding trifluoroacetic acid (TFA).

7. The method of claim 1, wherein isolating the precipitated supramolecular polymer from the bond disrupting agent includes filtering the precipitated supramolecular polymer from the solution including the bond disrupting agent, the precipitated supramolecular polymer including:
a plurality of monomer units that are non-covalently linked to form the supramolecular polymer, wherein the plurality of monomer units are characterized by ureido pyrimidinone moiety (UPy) terminals, carbon side-chains, and a moiety in the back-bone.

8. The method of claim 1, wherein isolating the precipitated supramolecular polymer from the bond disrupting agent includes centrifuging a mixture including the disassembled supramolecular polymer and the bond disrupting agent to remove a solution containing the bond disrupting agent.

9. The method of claim 1, wherein isolating the precipitated supramolecular polymer from the bond disrupting agent includes:
centrifuging a mixture including the disassembled supramolecular polymer and the bond disrupting agent to precipitate the supramolecular polymer from the disassembled supramolecular polymer; and
filtering the precipitated supramolecular polymer from a solution including the bond disrupting agent.

10. The method of claim 1, wherein adding the antisolvent to the solution includes adding methanol to the solution to reassemble the supramolecular polymer from the disassembled supramolecular polymer, the disassembled supramolecular polymer including oligomer or monomer units.

11. A method comprising:
adding a supramolecular polymer to a single-walled carbon nanotube (SWNT) mixture, the SWNT mixture including SWNTs of a first electrical type and SWNTs of a second electrical type, wherein adding the supramolecular polymer to the SWNT mixture forms a mixture of non-dispersed SWNTs of the first electrical type and non-dispersed supramolecular polymer, and a dispersed complex including the SWNTs of the second electrical type and the supramolecular polymer;
removing the non-dispersed SWNTs of the first electrical type from the dispersed complex;
adding a bond disrupting agent to the dispersed complex, the bond disrupting agent configured to disassemble the supramolecular polymer and release the SWNTs of the second electrical type from the supramolecular polymer; and
isolating the SWNTs of the second electrical type from the disassembled supramolecular polymer and the bond disrupting agent.

12. The method of claim 11, wherein adding the bond disrupting agent includes disrupting hydrogen-bonds that bond monomer units of the supramolecular polymer to disassemble the supramolecular polymer, wherein the SWNTs of the first electrical type include metallic SWNTs (M-SWNTs) and the SWNTs of the second electrical type include semiconducting SWNTs (S-SWNTs).

13. The method of claim 11, wherein adding the bond disrupting agent includes disrupting hydrogen-bonds that bond monomer units of the supramolecular polymer to disassemble the supramolecular polymer, wherein the SWNTs of the first electrical type include semiconducting SWNTs (S-SWNTs) and the SWNTs of the second electrical type include metallic SWNTs (M-SWNTs).

14. The method of claim 11, wherein the non-dispersed supramolecular polymer includes a portion of the supramolecular polymer that remains precipitated with the non-dispersed SWNTs of the first electrical type, and the non-dispersed SWNTs of the first electrical type are removed from the dispersed complex and the portion of the supramolecular polymer, further including:
adding an antisolvent to a solution including the disassembled supramolecular polymer and the bond disrupting agent to precipitate another portion of the supramolecular polymer, the other portion including the supramolecular polymer from the dispersed complex; and
isolating the precipitated supramolecular polymer, including the portion and the other portion of the supramolecular polymer, from the bond disrupting agent.

15. The method of claim 11, wherein the isolated SWNTs of the second electrical type have a purity of between 80 and 99.99 percent, and wherein removing the non-dispersed SWNTs of a first electrical type from the dispersed complex includes centrifuging the mixture of non-dispersed SWNTs of the first electrical type and the dispersed complex.

16. The method of claim 11, wherein isolating the SWNTs of the second electrical type from the disassembled supramolecular polymer and the bond disrupting agent includes:
centrifuging a mixture including the SWNTs of the second electrical type, the disassembled supramolecular polymer, and the bond disrupting agent; and
filtering the SWNTs of the second electrical type from a solution including the disassembled supramolecular polymer and the bond disrupting agent.

17. The method of claim 11, wherein an antisolvent is methanol and the bond disrupting agent is trifluoroacetic acid (TFA) and the supramolecular polymer includes a plurality of monomer units that are non-covalently linked, the plurality of monomer units being characterized by:

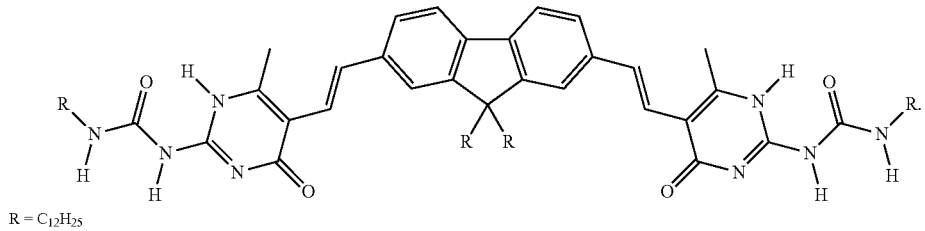

18. The method of claim 11, wherein SWNTs of the second electrical type are characterized by a purity and a yield based on dispersion parameters, the dispersion parameters including a ratio of supramolecular polymer to SWNT mixture, concentration of the SWNTs, sonication power and sonication time, the method further including further including adjusting at least one of the dispersion parameters to select the purity and yield of the SWNTs of the second electrical type.

19. The method of claim 18, wherein the dispersion parameters include a ratio of supramolecular polymer to SWNT mixture of 1 to 2 and a sonication power of 30% for 20 minutes.

20. The method of claim 11, further including adding dipolar aprotic solvent to the SWNTs of the second electrical type to re-disperse the SWNTs.

21. The method of claim 11, further including using the SWNTS of the second electrical type to form electronic circuitry selected from the group consisting of: transistors, stretchable electronics, flex circuits, flex transistors, thermal electronics, transparent electronics, display screens, solar panels, heaters and speakers.

22. The method of claim 11, further including forming a film using the SWNTs of the second electrical type.

23. The method of claim 11, further including doping the SWNTs of the second electrical type and using the doped SWNTs to form a resistor.

\* \* \* \* \*